United States Patent
Hayakawa et al.

(10) Patent No.: US 11,469,820 B2
(45) Date of Patent: *Oct. 11, 2022

(54) ADAPTIVE OPTICAL APPARATUS, OPTICAL SYSTEM, AND OPTICAL WAVEFRONT COMPENSATION METHOD

(71) Applicant: KAWASAKI JUKOGYO KABUSHIKI KAISHA, Kobe (JP)

(72) Inventors: Akiyoshi Hayakawa, Nagoya (JP); Ryuji Nagaoka, Kakamigahara (JP); Toru Nagai, Kakamigahara (JP); Fumio Wani, Konan (JP); Tokunari Nishimura, Kakamigahara (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 415 days.

This patent is subject to a terminal disclaimer.

(21) Appl. No.: 16/686,239

(22) Filed: Nov. 18, 2019

(65) Prior Publication Data

US 2020/0092005 A1    Mar. 19, 2020

Related U.S. Application Data

(63) Continuation of application No. PCT/JP2018/018991, filed on May 16, 2018.

(30) Foreign Application Priority Data

May 19, 2017  (JP) .............................. JP2017-099906

(51) Int. Cl.
*H04B 10/07* (2013.01)
*H04B 10/118* (2013.01)
(Continued)

(52) U.S. Cl.
CPC .......... *H04B 10/118* (2013.01); *G02B 26/06* (2013.01); *H04B 10/071* (2013.01)

(58) Field of Classification Search
CPC .... H04B 10/118; H04B 10/071; G02B 26/06; G02B 26/0825
See application file for complete search history.

(56) References Cited

U.S. PATENT DOCUMENTS 9,502,854 B1 * 11/2016 Filgas ..................... H01S 3/136
10,241,236 B2 * 3/2019 Takada ................... B32B 23/08
(Continued)

FOREIGN PATENT DOCUMENTS

JP          2000-68934 A       3/2000

*Primary Examiner* — Dzung D Tran
(74) *Attorney, Agent, or Firm* — Xsensus LLP

(57) ABSTRACT

An adaptive optical apparatus includes a first deformable mirror that includes a reflecting surface reflecting light propagated through an atmosphere, and a drive unit having a plurality of drive elements and changing an uneven shape of the reflecting surface, a second deformable mirror that includes a reflecting surface reflecting the light from the first deformable mirror and a drive unit having a plurality of drive elements and changing an uneven shape of the reflecting surface, a detector that detects light intensity of the light from the first deformable mirror and the second deformable mirror, and a controller that controls the drive unit of each of the first deformable mirror and the second deformable mirror. The controller is configured to execute a first update operation of controlling the drive unit of one deformable mirror based on a detected value by the detector.

20 Claims, 16 Drawing Sheets

(51) Int. Cl.
 *G02B 26/06* (2006.01)
 *H04B 10/071* (2013.01)

(56) References Cited

U.S. PATENT DOCUMENTS

| | | | |
|---|---|---|---|
| 11,092,800 B2* | 8/2021 | Hayakawa | G02B 26/0825 |
| 2012/0018614 A1* | 1/2012 | King | G02B 26/0816 |
| | | | 250/201.9 |

* cited by examiner

ADAPTIVE OPTICAL APPARATUS, OPTICAL SYSTEM, AND OPTICAL WAVEFRONT COMPENSATION METHOD

CROSS-REFERENCES TO RELATED APPLICATIONS

The present application claims priority to PCT/JP2018/018991 filed May 16, 2018, and JP 2017-099906 filed May 19, 2017, both of which are incorporated herein by reference.

TECHNICAL FIELD

The present invention relates to an adaptive optical apparatus, an optical system, and an optical wavefront compensation method.

BACKGROUND ART

Conventionally, there has been known a satellite-mounted optical communication apparatus equipped with an optical wavefront curvature corrector for distortion of an optical wavefront caused by atmospheric fluctuations.

The optical wavefront curvature corrector is a unit for correcting a wavefront curvature of an optical signal, and displaces a mirror surface of an adaptive optical mirror (deformable mirror) for each minute section based on the correspondence relation between intensity of the optical signal and the wavefront curvature. In this manner, influence by atmospheric fluctuations can be suppressed. In addition, it is also possible to achieve a function of compensating for influence of atmospheric fluctuations using a sensor for wavefront monitoring.

SUMMARY OF INVENTION

An adaptive optical apparatus includes a first deformable mirror that includes a reflecting surface reflecting light having propagated through an atmosphere and a drive unit having a plurality of drive elements and changing an uneven shape of the reflecting surface, a second deformable mirror that includes a reflecting surface reflecting the light from the first deformable mirror and a drive unit having a plurality of drive elements and changing an uneven shape of the reflecting surface, a detector that detects light intensity of the light from the first deformable mirror and the second deformable mirror, and a controller that controls the drive unit of each of the first deformable mirror and the second deformable mirror, in which the controller is configured to be capable of executing a first update operation of controlling the drive unit of one deformable mirror of the first deformable mirror and the second deformable mirror based on a detected value by the detector, so as to change the uneven shape of the reflecting surface of the one deformable mirror, and a second update operation of controlling the drive unit of the other deformable mirror of the first deformable mirror and the second deformable mirror based on a shape change amount of the reflecting surface of the one deformable mirror from a predetermined initial shape by repeatedly executing the first update operation a predetermined number of times, so as to change the uneven shape of the reflecting surface of the other deformable mirror.

Further, an optical wavefront compensation method is an optical wavefront compensation method of an adaptive optical apparatus including a first deformable mirror that includes a reflecting surface reflecting light having propagated through an atmosphere and a drive unit having a plurality of drive elements and changing an uneven shape of the reflecting surface, a second deformable mirror that includes a reflecting surface reflecting the light from the first deformable mirror and a drive unit having a plurality of drive elements and changing an uneven shape of the reflecting surface, a detector that detects light intensity of the light from the first deformable mirror and the second deformable mirror, and a controller that controls the drive unit of each of the first deformable mirror and the second deformable mirror, the method including a first update operation step of controlling by the controller the drive unit of one deformable mirror of the first deformable mirror and the second deformable mirror based on a detected value by the detector, so as to change the uneven shape of the reflecting surface of the one deformable mirror, and a second update operation step of controlling by the controller the drive unit of the other deformable mirror of the first deformable mirror and the second deformable mirror based on a shape change amount of the reflecting surface of the one deformable mirror from a predetermined initial shape by repeatedly executing the first update operation a predetermined number of times, so as to change the uneven shape of the reflecting surface of the other deformable mirror.

DESCRIPTION OF EMBODIMENTS

Embodiments will be described below with reference to the drawings. Note that the present invention is not limited by the following embodiments. Further, in the following, the same or corresponding elements will be denoted by the same reference signs throughout all the drawings, and the redundant description will be omitted.

Embodiment 1

Figure 1:
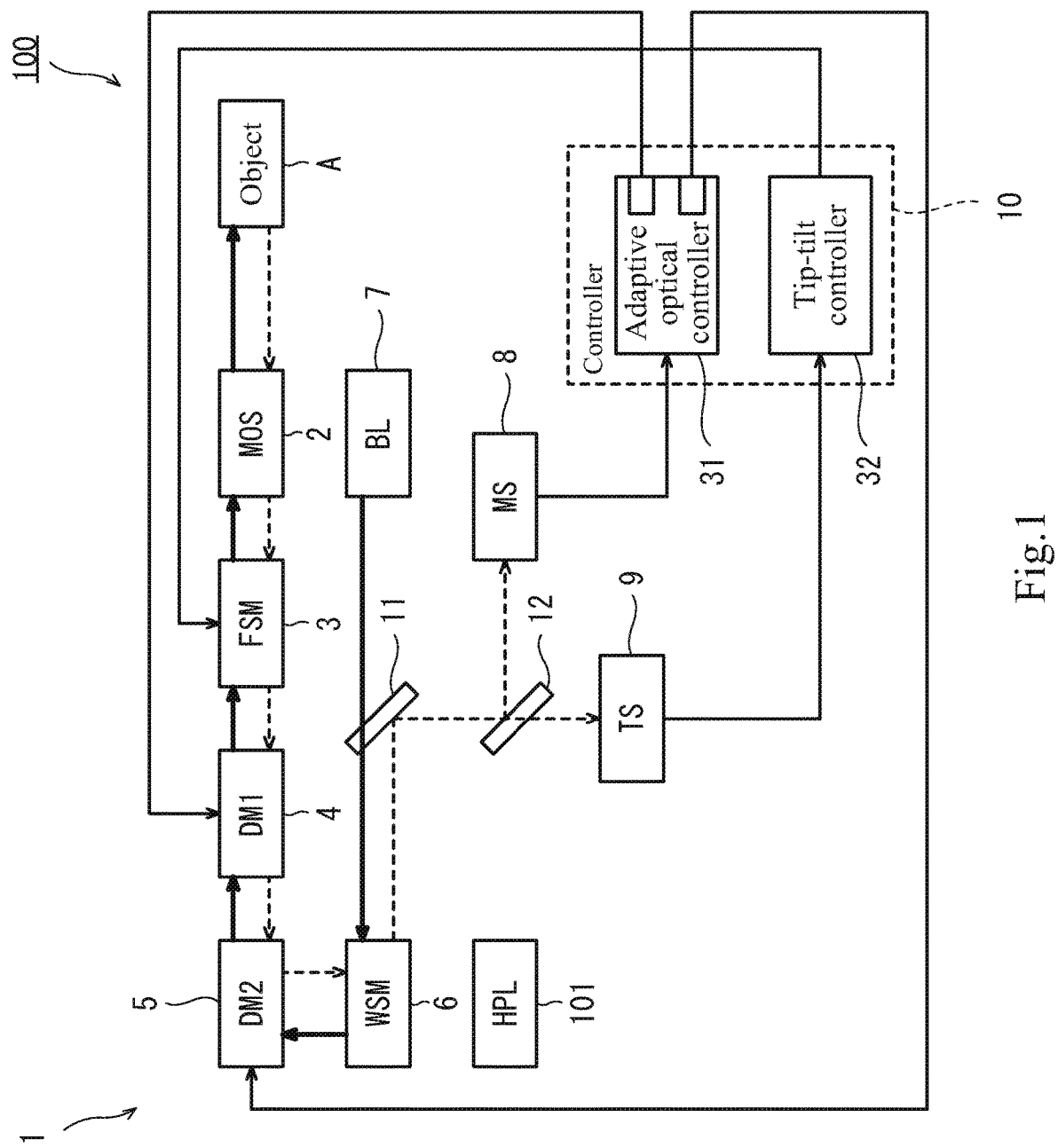
FIG. 1 is a block diagram illustrating a configuration example of an optical system including an adaptive optical apparatus according to Embodiment 1 and a configuration example of an optical path of a beacon laser when oscillating the beacon laser.

FIG. 1 is a block diagram illustrating a configuration example of an optical system 100 including an adaptive optical apparatus 1 according to Embodiment 1 and a configuration example of an optical path of a beacon laser when oscillating the beacon laser.

The optical system 100 includes laser oscillators (a beacon laser oscillator 7 and a high-power laser oscillator 101 described later), for example, and is used for an application to propagate laser light over a long distance (for example, several kilometers or more) in the atmosphere through a region including a vicinity of the ground, so as to irradiate an irradiated object A. In this application, when the ground is warmed by solar radiation, convection occurs therefrom, which becomes turbulence and causes a state that a non-uniformity of temperature distribution is generated in the atmosphere, that is, atmospheric fluctuation. The non-uniformity of temperature distribution corresponds to a non-uniformity of refractive index of light propagating through the space, distorts an optical wavefront, and causes deterioration of degree of concentration, fluctuations of a laser beam arrival position, and the like. The optical system 100 includes an adaptive optical apparatus 1 for compensating for deterioration of the degree of concentration, fluctuations of a laser beam arrival position, and the like. The irradiated object A is, for example, a flying object such as an airplane moving at high speed.

The adaptive optical apparatus 1 is an apparatus that compensates for deterioration of the degree of concentration, fluctuations of a laser beam arrival position, and the like due to atmospheric fluctuations by using, for example, an optimization method. As the optimization method, for example, a stochastic parallel gradient descent (SPGD) method can be used, but it is not limited to this, and for example, a genetic algorithm may be used instead. In the following, a configuration using the stochastic parallel gradient descent method will be described in detail.

The adaptive optical apparatus 1 includes a magnifying optical system 2, a fast steering mirror 3, a first deformable mirror 4, a second deformable mirror 5, a wavelength separating mirror 6, a beacon laser oscillator 7, a metric sensor 8, a tilt sensor 9, a controller 10, a first beam splitter 11, and a second beam splitter 12.

The beacon laser oscillator (BL) 7 is a device that oscillates laser light, and oscillates laser light having output at a level at which reflected light from the irradiated object A can be detected by the metric sensor 8 and the tilt sensor 9. Then, the laser light oscillated from the beacon laser oscillator 7 passes through the first beam splitter 11 and then passes through the wavelength separating mirror 6, the second deformable mirror 5, the first deformable mirror 4, the fast steering mirror 3, and the magnifying optical system 2 in this order and is emitted to an outside of the optical system 100, and reaches the irradiated object A as light having propagated through the atmosphere. This optical path constitutes an optical path on an outgoing path side in the optical system 100 (adaptive optical apparatus 1). A range of power that can be used by the beacon laser depends on a distance to a target and sensor sensitivity. When the distance to the target is one to several kilometers, a range of power that can be used by the beacon laser is several tens of watts to several hundreds of watts. However, this is merely an exemplary power, and any desired power beacon laser may be utilized.

Further, laser light reflected from the irradiated object A enters the optical system 100 as light having propagated through the atmosphere, passes through the magnifying optical system 2, the fast steering mirror 3, the first deformable mirror 4, the second deformable mirror 5, the wavelength separating mirror 6, the first beam splitter 11, and the second beam splitter 12 in this order and reaches the metric sensor 8 and the tilt sensor 9. This optical path constitutes an optical path on a return path side of the optical system 100 (adaptive optical apparatus 1). Then, the optical path on the outgoing path side between the irradiated object A and the wavelength separating mirror 6 and the optical path on the return path side between the irradiated object A and the wavelength separating mirror 6 are the same path. In addition, the orders of the elements on the optical paths of laser light are not limited to the above-described orders. For example, the order of the first deformable mirror 4 and the second deformable mirror 5 may be reversed.

The magnifying optical system (MOS) 2 has a function of magnifying a beam diameter of emitted laser light to a predetermined size, and includes, for example, an aspheric reflecting mirror. The magnifying optical system 2 is disposed, for example, at an end position of an inner section of the adaptive optical apparatus 1 in the optical path on the outgoing path side, that is, at a start position of an inner section of the adaptive optical apparatus 1 in the optical path on the return path side.

The fast steering mirror (FSM) 3 is configured to be capable of correcting a tip-tilt component of a wavefront, changes a reflection direction of incident light based on a drive signal received from a tip-tilt controller 32, and controls a direction of emitted light (an irradiation direction of laser light). Thus, laser light on the outgoing path emitted from the fast steering mirror 3 is adjusted in a direction of irradiating a predetermined position of the irradiated object A after being affected by atmospheric fluctuations.

Figure 3:
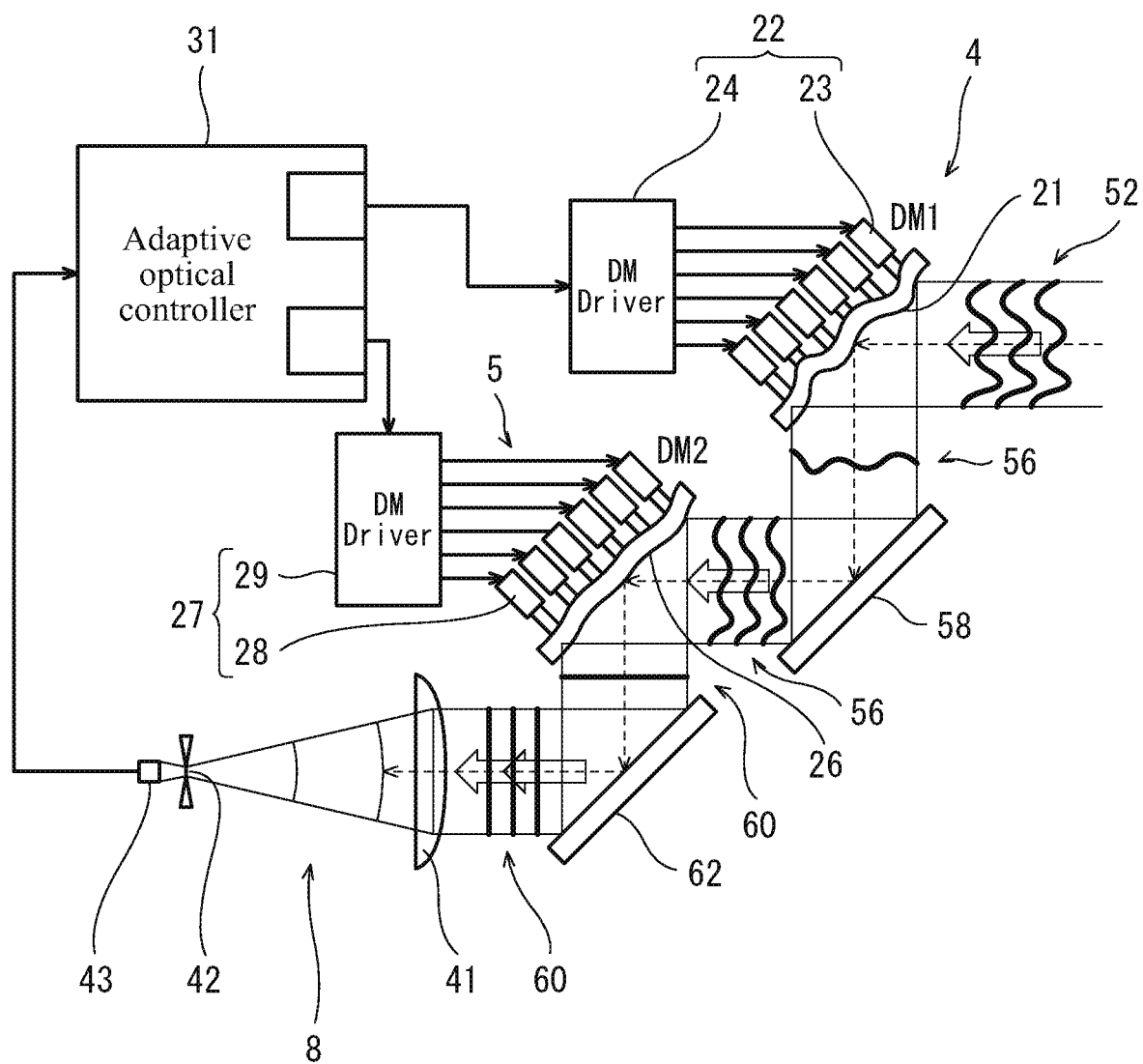
FIG. 3 is a view schematically illustrating a configuration example of the adaptive optical apparatus of the optical system of FIG. 1.

FIG. 3 is a view schematically illustrating a configuration example of the adaptive optical apparatus 1.

As illustrated in FIG. 3, the first deformable mirror (DM1) 4 includes a reflecting surface 21 that reflects laser light, and a drive unit 22 that changes an uneven shape of the reflecting surface 21. The first deformable mirror 4 is used to compensate for a wavefront error 52 of laser light by changing the uneven shape of the reflecting surface 21. The reflecting surface 21 of the first deformable mirror 4 reflects light having propagated through the atmosphere in the optical path on the return path side to have reduced wavefront error 56. Further, the reflecting surface 21 of the first deformable mirror 4 reflects laser light from the second deformable mirror 5 in the optical path on the outgoing path side. The drive unit 22 includes a plurality of drive elements 23 and a first deformable mirror driver 24. Then, each drive element 23 is operated based on a drive signal received from an adaptive optical controller 31 described later.

The second deformable mirror (DM2) 5 includes a reflecting surface 26 that reflects laser light, and a drive unit 27 that changes an uneven shape of the reflecting surface 26. The second deformable mirror 5 receives light from the first deformable mirror 4 after reflection off of a mirror 58 and reflects light towards a mirror 62 to have a further reduced wavefront error 60. Similarly to the first deformable mirror 4, the second deformable mirror 5 is used to compensate for a wavefront error 56 of laser light by changing the uneven shape of the reflecting surface 26. The reflecting surface 26 of the second deformable mirror 5 reflects laser light from the first deformable mirror 4 in the optical path on the return path side. Further, the reflecting surface 26 of the second deformable mirror 5 reflects laser light from the wavelength separating mirror 6, that is, laser light oscillated by the beacon laser oscillator 7 and the high-power laser oscillator 101 and superimposed on the same optical path in the optical path on the outgoing path side. The drive unit 27 includes a drive element 28 and a second deformable mirror driver 29. Then, each drive element 28 is operated based on a drive signal received from the adaptive optical controller 31 described later.

The first deformable mirror 4 and the second deformable mirror 5 are, for example, stack array type deformable mirrors, and are each configured such that a plurality of drive elements (piezo actuators) (drive elements 23, drive elements 28) are bonded to a back surface of a thin glass substrate constituting a mirror surface and having a front surface to which a high reflection coating of a dielectric multi-layer film or the like is applied. The plurality of drive elements are disposed in rows and columns on the back surface of the reflecting surface. The drive element expands and contracts in a normal direction (that is, an out-of-plane direction) of the reflecting surface according to a voltage applied. Then, the shape of the reflecting surface can be changed by changing a combination of expansion-contraction operations of the plurality of drive elements. Therefore, as the number of drive elements (number of channels) of the deformable mirror increases, the manufacturing cost increases but a complex uneven shape can be formed, which can be applied to compensation for a higher-order wavefront error in a Zernike polynomial. Thus, the number of drive elements is selected according to the range of the order of a wavefront error to be compensated. In the present embodiment, the numbers of drive elements of the first deformable mirror 4 and the second deformable mirror 5 are, for example, 37, which is the same number.

Then, each drive element 23 of the first deformable mirror 4 is associated with one of the plurality of drive elements 28 of the second deformable mirror 5 in a one-to-one correspondence relation. Then, the position of each drive element 23 disposed on a back surface of the reflecting surface 21 of the first deformable mirror 4 is arranged at the same position as the associated drive element 28 of the second deformable mirror 5 as each other, and the distribution of the drive elements 23 in the first deformable mirror 4 and the distribution of the drive element 28 in the second deformable mirror 5 are configured to be the same.

Further, a maximum displacement (stroke width) of the drive unit 27 of the second deformable mirror 5 is configured to be smaller than a maximum displacement (stroke width) of the drive unit 22 of the first deformable mirror 4. For example, the stroke width of the first deformable mirror 4 is 2 and the stroke width of the second deformable mirror 5 is 80 nm. Then, as the stroke width becomes larger, an independent deformable mirror can compensate for a lower order wavefront error in the Zernike polynomial, but responsiveness decreases. In the deformable mirror, as the stroke width decreases, it becomes difficult to compensate for a lower order wavefront error in the Zernike polynomial, but meanwhile responsiveness improves. For example, a response frequency of a shape changing operation of the reflecting surface 21 of the first deformable mirror 4 having a large stroke width is 10 kHz, and a response frequency of a shape changing operation of the reflecting surface 26 of the second deformable mirror 5 having a small stroke width is 50 kHz. Thus, the first deformable mirror 4 is a deformable mirror having a long stroke and a low speed, and the second deformable mirror 5 is a deformable mirror having a short stroke and a high speed.

In the present embodiment, the first deformable mirror 4 and the second deformable mirror 5 are stack array type deformable mirrors, but the present invention is not limited thereto. Instead of this, a bimorph type or MEMS type deformable mirror may be used.

The wavelength separating mirror 6 selects a wavelength to be reflected and a wavelength to be transmitted for each wavelength of laser light, as illustrated in FIG. 1. That is, the wavelength of laser light oscillated by the beacon laser oscillator 7 (beacon laser) and the wavelength of laser light oscillated by the high-power laser oscillator 101 (main laser) are selected to be different wavelengths. Thus, for example, in a case of the wavelength separating mirror 6 that transmits the beacon laser and reflects the main laser, the beacon laser and the main laser can be coaxially superimposed on the outgoing path side. Further, on the return path side, by guiding the light transmitted through the wavelength separating mirror 6, it is possible to select return light of the main laser (the main laser reflected at the irradiated object A) and return light of the beacon laser (the beacon laser reflected at the irradiated object A). The transmission and reflection for each wavelength of the beacon laser and the main laser in the wavelength separating mirror 6 can be configured in reverse.

The metric sensor (MS) (detector) 8 detects light intensity of laser light from the first deformable mirror 4 and the second deformable mirror 5 via the wavelength separating mirror 6 in the optical path on the return path side, and outputs a detected value. The metric sensor 8 includes, for example, a condensing lens 41 and a sensor main body 43 that detects light intensity of laser light having passed through a pinhole 42 having an appropriate diameter and disposed at a light collection point of the condensing lens 41. The sensor main body 43 is a high-speed light detection element such as a photodiode, and is configured such that a detected value is maximized in a desired incident wavefront state. Thus, the metric sensor 8 is configured to detect the degree of collection performance of laser light. The detected value output from the metric sensor 8 is input to the adaptive optical controller 31. In addition, the light detected by the metric sensor 8 is not limited to light oscillated from the beacon laser oscillator 7.

The tilt sensor (TS) 9 detects an amount of deviation from the central axis of a light collecting position corresponding to an inclination component (tip-tilt component) of an optical wavefront when laser light reflected by the irradiated object A is affected by atmospheric fluctuations and enters the optical system 100, and outputs a detected value. The detected value output from the tilt sensor 9 is input to the tip-tilt controller 32.

The controller 10 includes, for example, an arithmetic unit such as a microcontroller, a CPU, an ASIC, or a programmable logic device (PLD) such as FPGA, each of which is circuitry. The controller 10 may include an independent controller that performs centralized control, or may be constituted of a plurality of controllers that perform distributed control in cooperation with each other. The controller 10 also includes a storage unit or memory that stores various programs and data. The controller 10 includes an adaptive optical controller 31 and a tip-tilt controller 32. The adaptive optical controller 31 and the tip-tilt controller 32 may each be configured as a functional block implemented by the controller 10 executing a predetermined control program stored in the storage unit.

The adaptive optical controller 31 controls the drive unit 22 of the first deformable mirror 4 and the drive unit 27 of the second deformable mirror 5 based on a detected value received from the metric sensor 8. That is, the adaptive optical controller 31 controls operation of the plurality of drive elements 23 via the first deformable mirror driver 24, so as to change the uneven shape of the reflecting surface 21. Further, the adaptive optical controller 31 controls operation of the plurality of drive elements 28 via the second deformable mirror driver 29, so as to change the uneven shape of the reflecting surface 26 (see FIG. 3).

Furthermore, the adaptive optical controller 31 is configured to be able to execute a first update operation and a second update operation (details will be described later). The adaptive optical controller 31 outputs a control signal to the first deformable mirror 4 and a control signal to the second deformable mirror 5.

The tip-tilt controller 32 calculates a tilt component (tip-tilt component) of an optical wavefront when laser light in the return path is affected by atmospheric fluctuations and enters the optical system 100 based on a detected value received from the tilt sensor 9. Then, a control signal to the fast steering mirror 3 for controlling operation of the fast steering mirror 3 is output so that the tilt component of the optical wavefront in the tilt sensor 9 becomes zero, that is, the outgoing path side has the same tilt component as the return path side.

The first beam splitter 11 and the second beam splitter 12 partially reflect incident light and transmit remaining light, so as to split the laser light into different optical paths, or merge (superimpose) optical paths of a plurality of laser lights of different optical paths into one optical path.

The first beam splitter 11 reflects a part of laser light incident from the wavelength separating mirror 6 toward the second beam splitter 12 in the optical path on the return path side. In addition, the first beam splitter 11 places (superimposes) laser light emitted from the beacon laser oscillator 7 in the optical path on the outgoing path side onto the same optical path as the optical path on the return path side through which laser light from the wavelength separating mirror 6 is incident on the first beam splitter 11.

The second beam splitter 12 partially reflects laser light incident from the first beam splitter 11 in the optical path on the return path side, and the reflected laser light is incident on the metric sensor 8. Further, the second beam splitter 12 transmits remaining laser light, and the transmitted laser light is incident on the tilt sensor 9.

Figure 2:
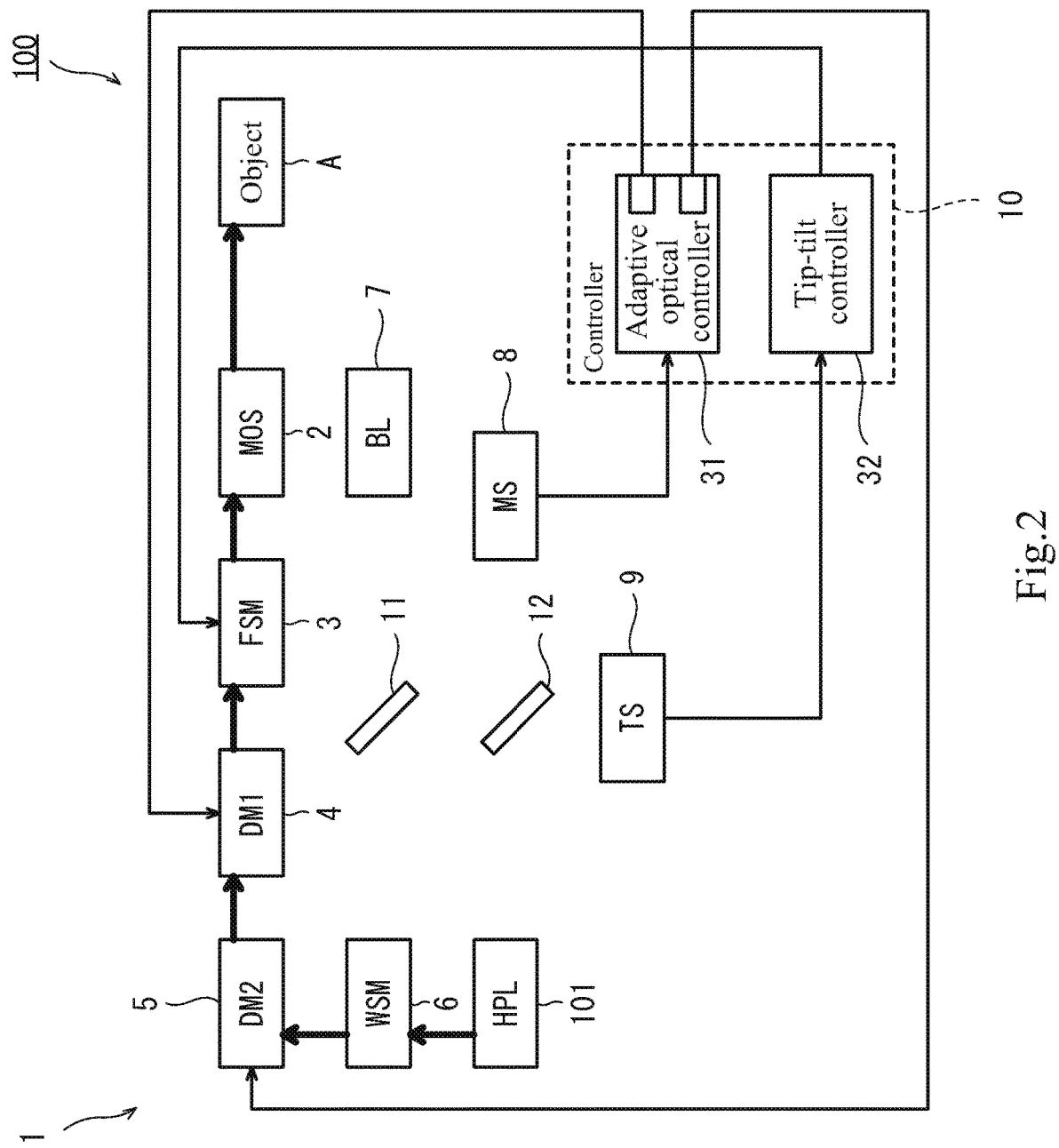
FIG. 2 is a block diagram illustrating a configuration example of the optical system of FIG. 1 and a configuration example of an optical path of a main laser when oscillating the main laser.

FIG. 2 is a block diagram illustrating a configuration example of the optical system 100 and a configuration example of an optical path of the main laser when oscillating the main laser.

As illustrated in FIG. 2, the optical system 100 includes a high-power laser oscillator 101. The high-power laser oscillator 101 is a device that oscillates laser light, and oscillates high-power laser light, that is, a main laser. A range of power that can be used by the high power laser is 1 kW to 1 MW, for example. The wavelength of the main laser is configured to be different from the wavelength of the beacon laser. Then, the laser light oscillated from the high-power laser oscillator 101 passes through the wavelength separating mirror 6, the second deformable mirror 5, the first deformable mirror 4, the fast steering mirror 3, and the magnifying optical system 2 in this order, and is emitted to the outside of the optical system 100, propagates through the atmosphere, and reaches the irradiated object A. The optical path of a section between the wavelength separating mirror 6 (the second deformable mirror 5) and the irradiated object A is the same path as an optical path of the beacon laser in the same section.

[Operation Example]

Next, an operation example of the optical system 100 will be described.

Figure 4:
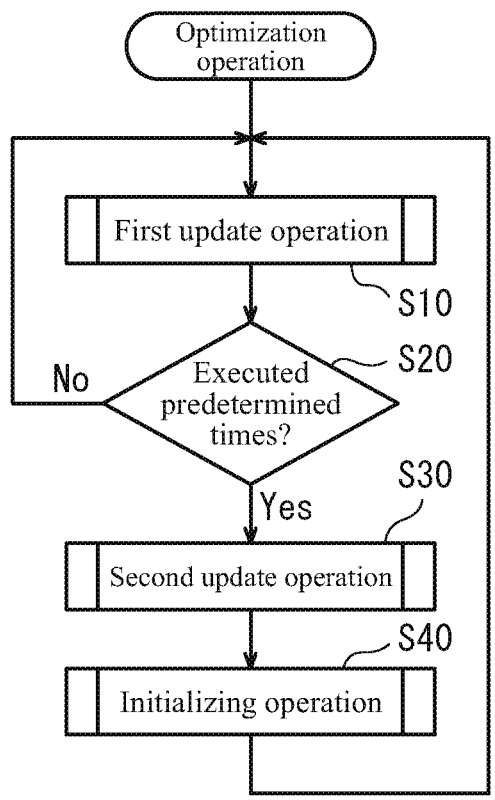
FIG. 4 is a flowchart illustrating an operation example of the optical system of FIG. 1.
Figure 5:
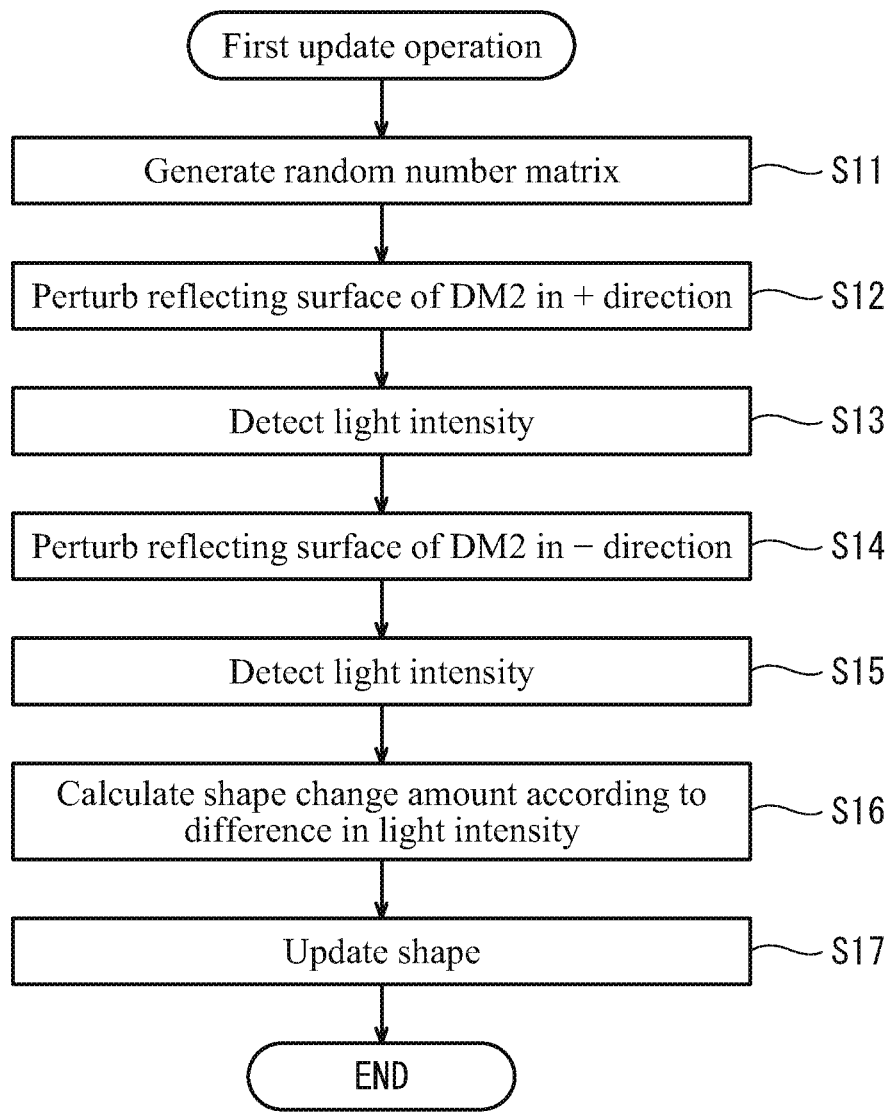
FIG. 5 is a flowchart illustrating an operation example of the optical system of FIG. 1.
Figure 6:
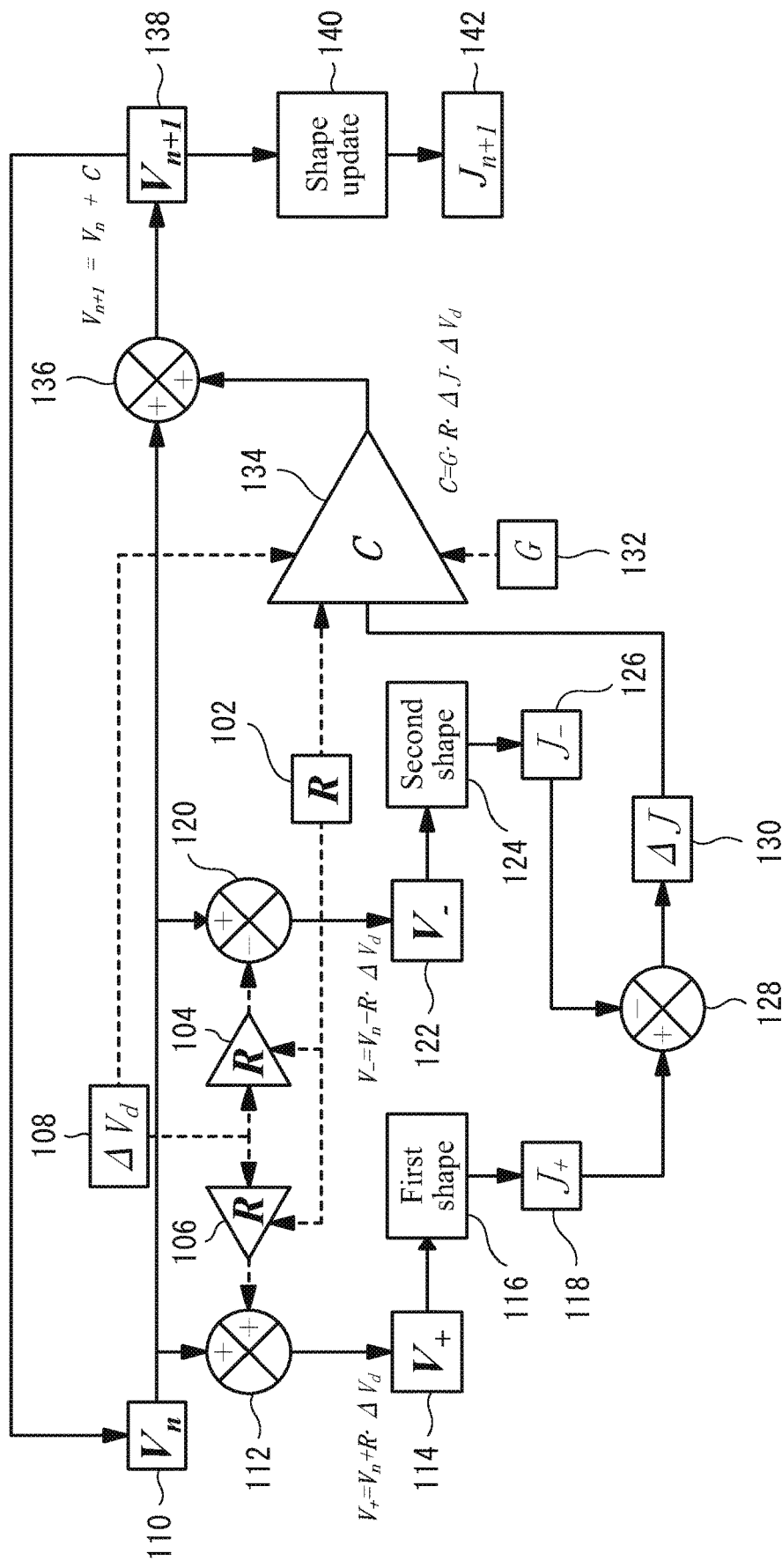
FIG. 6 is a block diagram illustrating an operation example of a first update operation of the optical system of FIG. 1.
Figure 7:
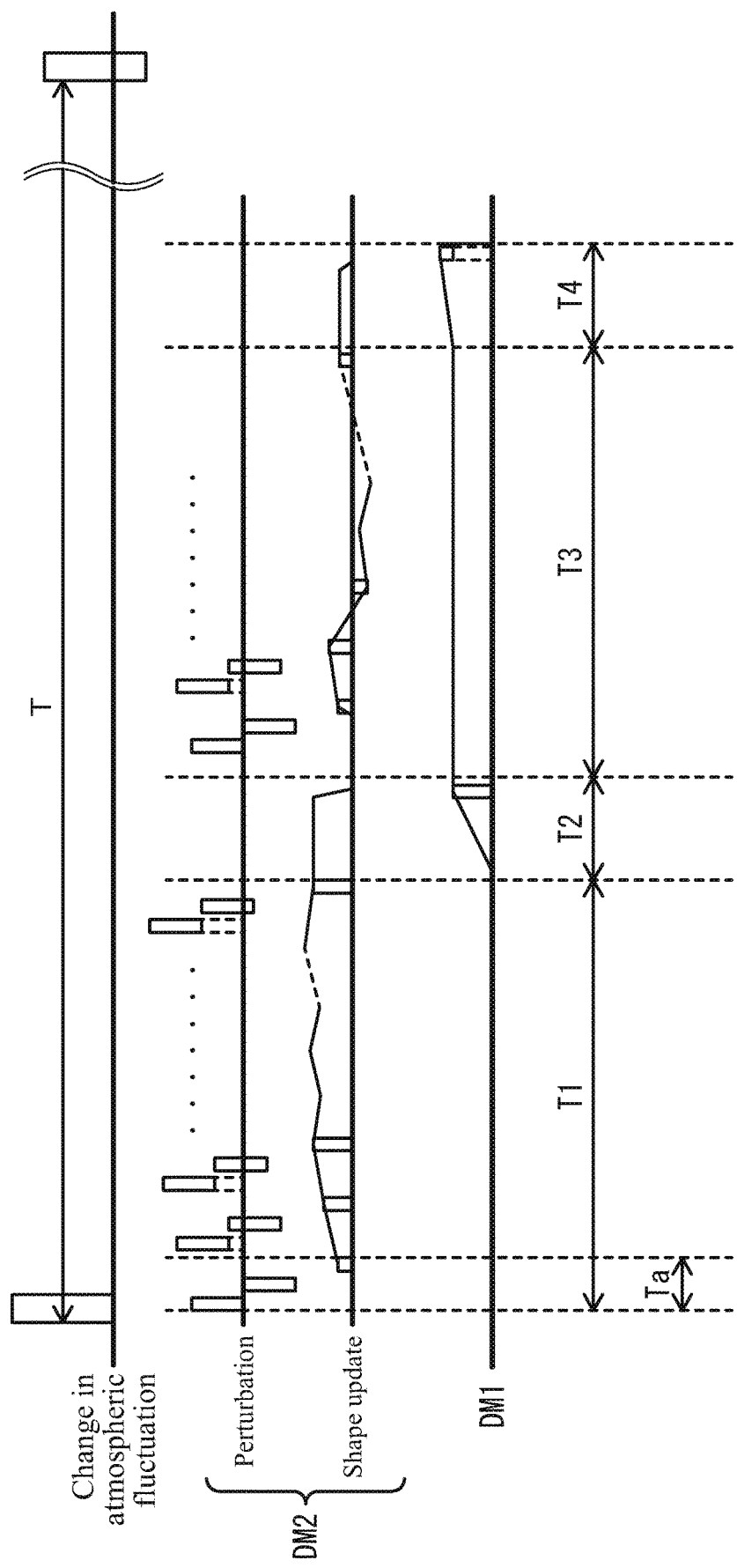
FIG. 7 is a time chart illustrating an operation example of the optimization operation of the optical system of FIG. 1.

FIGS. 4 and 5 are flowcharts illustrating an operation example of the optical system 100. FIG. 6 is a block diagram illustrating an operation example of a first update operation of the optical system 100. FIG. 7 is a time chart illustrating an operation example of the optimization operation of the optical system 100.

First, when the beacon laser oscillator 7 oscillates laser light, the oscillated laser light passes through the first beam splitter 11, and passes through the wavelength separating mirror 6, the second deformable mirror 5, the first deformable mirror 4, the fast steering mirror 3, and the magnifying optical system 2 in this order, and is emitted to the outside of the optical system 100, propagates through the atmosphere, and reaches the irradiated object A. Then, laser light reflected by the irradiated object A enters the optical system 100 as light having propagated through the atmosphere and passes through the magnifying optical system 2, the fast steering mirror 3, the first deformable mirror 4, the second deformable mirror 5, the wavelength separating mirror 6, the first beam splitter 11, and the second beam splitter 12 in this order and reaches the metric sensor 8, and the metric sensor 8 detects light intensity of the reflected light affected by atmospheric fluctuations.

Then, the adaptive optical controller 31 repeatedly executes the following optimization operation a predetermined number of times (for example, 25 times). Thereafter, when a predetermined period T (see FIG. 7) set according to atmospheric fluctuation conditions passes, the adaptive optical controller 31 repeatedly executes the optimization operation again.

In the optimization operation, the adaptive optical controller 31 first executes the first update operation (step S10). The first update operation is an operation of controlling the drive unit 27 of the second deformable mirror 5 based on a detected value of the metric sensor 8, so as to change the uneven shape of the reflecting surface 26 of the second deformable mirror 5.

Specifically, in the first update operation, the adaptive optical controller 31 first generates a random number matrix R 102 having the same number of components as the number of channels of the second deformable mirror 5 (step S11). Details of this first update operation are shown in FIG. 5.

Next, the adaptive optical controller 31 calculates $V_+$ according to the following equation (1).

$$V_+ = V_n + R \cdot \Delta V_d \qquad (1)$$

Here, $V_+$ 114 is an applied voltage matrix to the drive elements of the second deformable mirror at a time of perturbation in a positive direction at a time of the first update operation, $V_n$ 110 is an applied voltage matrix to the second deformable mirror before the first update operation for an n-th (n is an integer of 1 or more) time, and $\Delta V_d$ 108 is a predetermined voltage corresponding to a predetermined perturbation amplitude.

The random number matrix R 102 is sent to a multiplier 106 where R is multiplied by $\Delta V_d$ and then added in an adder 112 with $V_n$ 110 to obtain $V_+$ 114. Then, the adaptive optical controller 31 applies a voltage related to an element of $V_+$ corresponding to each drive element 28 of the second deformable mirror 5, so as to change the uneven shape of the reflecting surface 26 of the second deformable mirror 5 from a shape before starting the first update operation for the n-th time to a first shape 116 to perturb the reflecting surface 26 of the second deformable mirror 5 in the positive direction (to give a positive dither) (step S12). As indicated in the above equation (1), the first shape is the shape of the reflecting surface 26 of the second deformable mirror 5 defined by adding a shape change amount randomly selected in every time of the first update operation on the plurality of drive elements 28 of the second deformable mirror 5 to the shape before starting the first update operation for the n-th time. In the first update operation that is repeatedly executed in this manner, it is possible to effectively prevent falling into a local optimum in the optimization operation by randomly selecting the shape change amount in every operation. Note that in the present embodiment, R is a matrix in which one of 1 or −1 is randomly selected, and $\Delta V_d$ is a predetermined value.

Next, the adaptive optical controller 31 obtains light intensity J+118 of the reflected light having passed through the first deformable mirror 4 and the second deformable mirror 5 in which the reflecting surface 26 is perturbed in the +(plus) direction in this order, and reached the metric sensor 8 (step S13).

Next, the adaptive optical controller 31 calculates V_ according to the following equation (2).

$$V_- = V_n - R \cdot \Delta V_d \quad (2)$$

Here, $V_-$ 122 is an applied voltage matrix to the drive elements of the second deformable mirror at a time of perturbation in a negative direction at a time of the first update operation.

The random number matrix R 102 is sent to a multiplier 104 where R is multiplied by $\Delta V_d$ and then subtracted in an adder 120 from $V_n$ 110 to obtain V− 122.

Then, the adaptive optical controller 31 applies a voltage related to an element of V− corresponding to each drive element 28 of the second deformable mirror 5, so as to change it to a second shape 124 to perturb the reflecting surface 26 of the second deformable mirror 5 in the negative direction (to give a negative dither) (step S14). As indicated in the above equation (2), the second shape is a shape in which the uneven shape of the reflecting surface 26 of the second deformable mirror 5 is symmetrical to the first shape with respect to the shape before starting the first update operation for the n-th time.

Next, the adaptive optical controller 31 obtains light intensity J_ 126 of the reflected light having passed through the first deformable mirror 4 and the second deformable mirror 5 in which the reflecting surface 26 is perturbed in the − (minus) direction in this order, and reached the metric sensor 8 (step S15).

Next, the adaptive optical controller 31 calculates the shape change amount $V_C$ according to the following equations (3) and (4) (step S16).

$$V_C = G \cdot R \cdot \Delta J \cdot \Delta V_d \quad (3)$$

$$\Delta J = J_+ - J_- \quad (4)$$

Here,

G is a gain in this optimization control and is a predetermined value.

J_ 126 is subtracted from J+ 118 in an adder 128 in order to obtain ΔJ 130. A multiplier 134 multiplies a gain G 132 with the matrix R 102, ΔJ 130, and $\Delta V_d$ 108 which is added to $V_n$ 110 in adder to 136 to obtain $V_{n+1}$ 138.

Next, the adaptive optical controller 31 applies a voltage related to an element of $V_{n+1}$ of the following equation (5) corresponding to each drive element 28 of the second deformable mirror 5, thereby updating the shape 140 of the reflecting surface 26 of the second deformable mirror 5 (step S17) which results in an intensity of $J_{n+1}$ 142.

$$V_{n+1} = V_n + V_C \quad (5)$$

As indicated in the equations (1) to (5), in the optimization method using the stochastic parallel gradient descent method, the detected value of the metric sensor 8 constitutes an evaluation function in the optimization method.

As described above, in the first update operation, the adaptive optical controller 31 changes the uneven shape of the reflecting surface 26 of the second deformable mirror 5 toward one shape out of the first shape and the second shape that has stronger light intensity detected by the metric sensor 8, so as to update the uneven shape of the reflecting surface 26 of the second deformable mirror 5. That is, when the value of the light intensity $J_+$ is larger than the light intensity $J_-$, the value of ΔJ becomes positive, and the value of the shape change amount $V_C$ denotes a value that causes the uneven shape of the reflecting surface 26 of the second deformable mirror 5 to be changed to the first shape side from the shape before starting the first update operation for the n-th time. On the other hand, when the value of the light intensity $J_+$ is smaller than the light intensity $J_-$, the value of ΔJ becomes negative, and the value of the shape change amount $V_C$ denotes a value that causes the uneven shape of the reflecting surface 26 of the second deformable mirror 5 to be changed to the second shape side from the shape before starting the first update operation for the n-th time. That is, the adaptive optical controller 31 calculates the shape change amount $V_C$ so that the uneven shape of the reflecting surface 26 of the second deformable mirror 5 is changed in a direction in which the light intensity increases, so as to update the uneven shape of the reflecting surface 26 of the second deformable mirror 5.

Further, as indicated in the above equation (3), the value of the shape change amount $V_C$ becomes smaller as the uneven shape of the reflecting surface 26 of the second deformable mirror 5 approaches a convergent shape and the value of ΔJ becomes smaller, and thus the uneven shape of the reflecting surface 26 of the second deformable mirror 5 can be appropriately converged.

Next, the adaptive optical controller 31 executes the first update operation a predetermined number of times (step S20). When the degree of concentration is degraded due to the influence of atmospheric fluctuations and the beam diameter at the light collection point expands, the light intensity passing through a minute aperture such as a pinhole provided at the light collection point becomes weak. The adaptive optical controller 31 repeatedly updates the uneven shape of the reflecting surface 26 of the second deformable mirror 5 so that light intensity of a central portion at a light collection point of this laser light approaches a maximum value using the optimization method.

After executing the first update operation a predetermined number of times, the adaptive optical controller 31 next executes a second update operation (step S30). The second update operation is an operation of controlling the drive unit 22 of the first deformable mirror 4 based on a shape change amount of the reflecting surface 26 of the second deformable mirror 5 from a predetermined initial shape (the shape when starting the first update operation for the first time) by repeatedly executing the first update operation a predetermined number of times, so as to change and update the uneven shape of the reflecting surface 21 of the first deformable mirror 4.

That is, in the second update operation, the adaptive optical controller 31 operates each drive element 23 of the first deformable mirror 4 to add a difference in shape of the reflecting surface 26 of the second deformable mirror 5 between a start time and an end time of the first update operation to the reflecting surface 21 of the first deformable mirror 4. Specifically, the adaptive optical controller 31 calculates an operating amount (moving amount) from the start time to the end time of the first update operation of the drive elements 28 for each drive element 28 of the second deformable mirror 5, and operates the drive element 23 of the first deformable mirror 4 corresponding to this drive element 28 by the same operating amount as the calculated operating amount. More specifically, the adaptive optical controller 31 applies a voltage related to an element of $V2_{n+1}$ of the following formula (6) corresponding to each drive element 23 to each drive element 23 of the first deformable mirror 4, thereby updating the uneven shape of the reflecting surface 21 of the first deformable mirror 4.

$$V2_{n+1} = V2_n + V_C \quad (6)$$

Here,

V2n is an applied voltage matrix to the first deformable mirror before the optimization operation for the n-th time, and $V_C$ is a matrix of the amount of change in applied voltage for causing the drive elements of the first deformable mirror to operate by the same operating amount as the operating amount from the start time to the end time of the first update operation of the drive elements of the second deformable mirror.

In this manner, the shape change amount of the reflecting surface 26 of the second deformable mirror 5 can be accurately transferred to the reflecting surface 21 of the first deformable mirror 4 to update the reflecting surface. During this time, the adaptive optical controller 31 is configured to stop the first update operation.

Note that in the present embodiment, the numbers of channels of the first deformable mirror 4 and the second deformable mirror 5 are the same, and each of drive elements 23 of the first deformable mirror 4 corresponding to the drive elements 28 of the second deformable mirror 5 is operated by the same operating amount as the operating amount from the start time to the end time of the first update operation of the drive element 28 of the second deformable mirror 5, thereby transferring the shape change amount of the second deformable mirror 5 to the first deformable mirror 4. However, for example, when the numbers of channels of the first deformable mirror 4 and the second deformable mirror 5 are different and the drive elements 23 of the first deformable mirror 4 and the drive elements 28 of the second deformable mirror 5 are not associated with each other, the adaptive optical controller 31 may calculate the operating amount of the drive elements 23 of the first deformable mirror 4 based on the shape change amount of the reflecting surface 26 of the second deformable mirror 5.

Next, the adaptive optical controller 31 executes an initializing operation of the second deformable mirror 5 (step S40). The initializing operation of the second deformable mirror 5 is an operation of updating the uneven shape of the reflecting surface 26 of the second deformable mirror 5 to a predetermined initial shape (a shape when starting the first update operation for the first time). Thus, the detected value of the metric sensor 8 before the second update operation and the detected value of the metric sensor 8 after the initializing operation are configured to indicate substantially the same value. The shape change amount of the second deformable mirror 5 can be transferred to the first deformable mirror 4 by a series of these operations.

Note that the initializing operation is performed at the timing of executing the second update operation. Although the initializing operation is performed immediately after the second update operation in the present embodiment, the present invention is not limited thereto, and the initializing operation may be performed simultaneously with the second update operation or immediately before the second update operation instead.

Then, as illustrated in FIG. 7, the adaptive optical controller 31 executes the first update operation in a time zone T1, and performs the second update operation and the initializing operation in a time zone T2. Further, in a time zone Ta included in the time zone T1 in which the first update operation is executed, the adaptive optical controller 31 performs a perturbation in the positive direction and a perturbation in the negative direction of the second deformable mirror 5, and an update operation of the uneven shape of the reflecting surface 26 of the second deformable mirror 5. Then, the adaptive optical controller 31 performs the first update operation again in a time zone T3, and performs the second update operation and the initializing operation in a time zone T4. In this manner, the adaptive optical controller 31 repeatedly executes the first update operation, the second update operation, and the initializing operation. In addition, it can be estimated that an atmospheric compensation control bandwidth of about 270 Hz can be obtained by maintaining this repetitive operation.

As described above, in the present embodiment, since the adaptive optical apparatus 1 is configured to repeatedly perform the first update operation a predetermined number of times using the second deformable mirror 5 having high response performance while having a small stroke width, high speed optimization can be performed, and a control speed can be improved. Since the shape change amount is transferred to the second deformable mirror 5 after performing the first update operation a predetermined number of times, it is possible to prevent the stroke width from being insufficient when the optimization operation is repeatedly performed, and it is possible to properly perform not only compensation for a high-order wavefront error but also compensation for a low-order wavefront error.

As described above, the adaptive optical apparatus 1 performs compensation using the optimization method to repeatedly change the uneven shapes of the reflecting surfaces of the deformable mirrors using a detected value of the metric sensor 8 as an evaluation function, even if a spiral component of phase is generated under conditions where atmospheric fluctuations are strong, or the like, compensation for this can be performed with high accuracy. Specifically, a spiral component of phase may occur, and a large step-like component may occur in the optical wavefront. However, it is difficult to correctly measure this step-like component with, for example, a Shack-Hartmann type wavefront sensor that divides an incident beam cross-section into a plurality of sub-apertures, and uses a light collecting position in each sub-aperture as an average wavefront slope so as to reproduce the entire wavefront shape, and if compensation control is performed based on this, the degree of concentration is degraded conversely. However, since the adaptive optical apparatus 1, by the optimization method, takes the process of changing the uneven shape of the reflecting surface of the deformable mirror to a shape that finally increases the degree of concentration even if the step-like component is present, even under conditions where atmospheric fluctuations are strong, or the like, if control speed can follow the speed of the atmospheric fluctuations, the compensation can be performed accurately.

Incidentally, as compared with the adaptive optical apparatus using the wavefront sensor, the adaptive optical apparatus to which the optimization method is applied requires an overwhelmingly high control speed when following atmospheric fluctuations at the same speed. Thus, it has been difficult to ensure a practically adequate control speed under conditions where atmospheric fluctuations are strong to perform sufficient compensation. In a case where the adaptive optical apparatus 1 uses an optimization method for causing the deformable mirror to converge to the optimum shape through a plurality of update operations, even when it is difficult to secure a control speed (response speed) and a stroke necessary for an independent deformable mirror, by cooperatively controlling the first deformable mirror 4 and the second deformable mirror 5 as described above, a stroke necessary for compensation can be secured and a control speed that can follow the speed of atmospheric fluctuations can be ensured. That is, the optimization method can be applied to an adaptive optical apparatus used under conditions where atmospheric fluctuations are strong, and compensation for a high-order optical wavefront under conditions where atmospheric fluctuations are strong can be accurately performed.

Then, since the optical path on the outgoing path side between the irradiated object A and the second deformable mirror 5 and the optical path on the return path side between the irradiated object A and the second deformable mirror 5 are configured to be the same path, by performing a compensation operation for correcting the influence of atmospheric fluctuations on the return path side, similar compensation can be performed on the outgoing path side.

<Modification Example>

In addition, the first deformable mirror 4 may have a high speed and a short stroke and the second deformable mirror 5 may have a low speed and a long stroke, and the second update operation may be executed on the first deformable mirror 4 and the first update operation may be executed on the second deformable mirror 5.

Further, the first deformable mirror 4 is not limited to a single deformable mirror. For example, a plurality of deformable mirrors having a low speed and a long stroke corresponding to the first deformable mirror 4 may be provided, and in the second update operation, the adaptive optical controller 31 may select one deformable mirror out of a plurality of deformable mirrors corresponding to the first deformable mirror 4 based on the shape change amount of the reflecting surface 26 of the second deformable mirror 5 by the first update operation, so as to change and update the uneven shape of the reflecting surface of the selected deformable mirror.

Embodiment 2

Hereinafter, a configuration and operation of the optical system 200 including an adaptive optical apparatus 201 according to Embodiment 2 will be described focusing on differences from Embodiment 1.

[Configuration]

Figure 8:
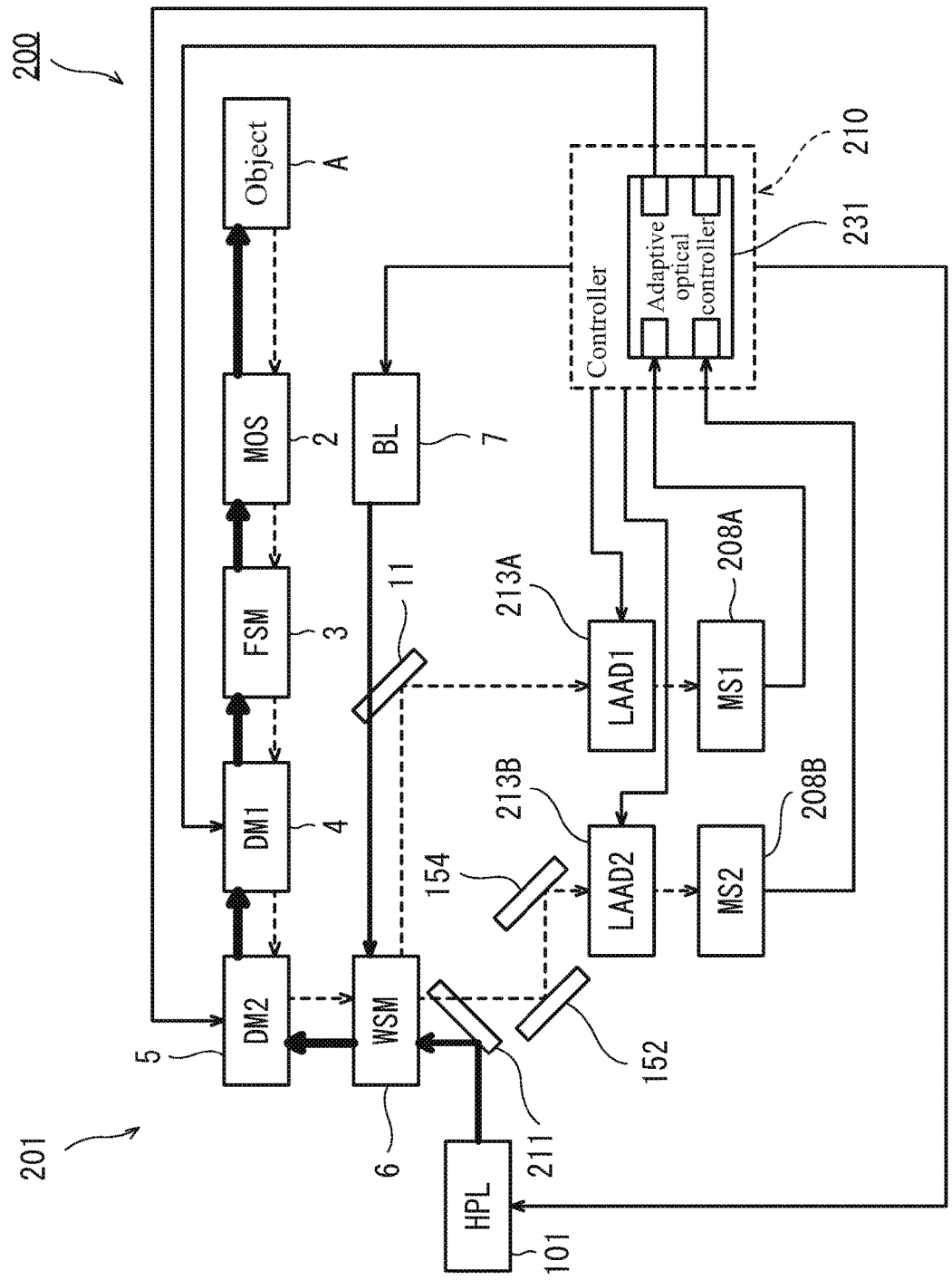
FIG. 8 is a block diagram illustrating a configuration example of an optical system including an adaptive optical apparatus according to Embodiment 2 and a configuration example of an optical path of a beacon laser when oscillating the beacon laser.

FIG. 8 is a block diagram illustrating a configuration example of the optical system 200 according to Embodiment 2 and a configuration example of optical paths of a beacon laser and a main laser when oscillating the beacon laser and the main laser.

As illustrated in FIG. 8, the adaptive optical apparatus 201 of Embodiment 2 includes a magnifying optical system 2, a fast steering mirror 3, a first deformable mirror 4, a second deformable mirror 5, a wavelength separating mirror 6, a beacon laser oscillator 7, a high-power laser oscillator 101, a first metric sensor 208A, a first light amount adjusting device 213A, a second metric sensor 208B, a second light amount adjusting device 213B, a controller 210 including an adaptive optical controller 231, a first beam splitter 11, and a high-power laser reflecting mirror 211 with a light amount monitoring function. Note that in FIG. 8, the tilt sensor 9, the second beam splitter 12, and the tip-tilt controller 32 of Embodiment 1 are omitted in the illustration, but also in Embodiment 2, the adaptive optical apparatus 1 includes them similarly to Embodiment 1, and performs correction of a tip-tilt component of a wavefront using the fast steering mirror 3.

The optical system 200 guides each of light reflected by the wavelength separating mirror 6 and light transmitted through the wavelength separating mirror 6 in the optical path on the return path side, so that return light of the main laser and return light of the beacon laser (laser light reflected at an irradiated object A) are separated and split into two different optical paths. Then, the return light of the beacon laser having passed through the wavelength separating mirror 6 passes through the first beam splitter 11 and the first light amount adjusting device 213A in this order and reaches the first metric sensor 208A. Further, the return light of the main laser having passed through the wavelength separating mirror 6 is guided to an optical path different from the optical path of return light of the beacon laser, and transmitted through the high-power laser reflecting mirror 211 with a light amount monitoring function, and passes through the second light amount adjusting device 213B in this order and reaches the second metric sensor 208B.

The high-power laser reflecting mirror 211 with light amount monitoring function is constructed by applying a high reflection coating to a front surface of a substrate material such as synthetic quartz having a very high transmittance to a main laser wavelength and an anti-reflection coating to a back surface thereof. In the optical path on the return path side, when the return light of the main laser incident from the wavelength separating mirror 6 reflects on the high-power laser reflecting mirror 211 with a light amount monitoring function, a small amount of light transmitted through the high reflection coating on the front surface is used as monitor light to be incident on the second metric sensor 208B.

The first metric sensor (MS1) (detector) 208A detects light intensity of return light of the beacon laser from the first deformable mirror 4 and the second deformable mirror 5 via the wavelength separating mirror 6 in the optical path of return light on the return path side, and outputs a detected value. The detected value output from the first metric sensor 208A is input to the adaptive optical controller 231. The other aspects of the first metric sensor 208A are similar to that of the metric sensor 8 of above Embodiment 1, and thus the description thereof will be omitted.

The first light amount adjusting device (LAAD1) 213A is provided to be interposed between the wavelength separating mirror 6 and the first metric sensor 208A in the optical path of return light of the beacon laser on the return path side. The first light amount adjusting device 213A adjusts the light amount of the beacon laser having passed through the first light amount adjusting device 213A and is incident on the first metric sensor 208A. The first light amount adjusting device 213A is an adjustment mechanism that switches insertion of a reflection type ND ("Neutral Density") filter having several reflectances by external control drive as a light amount control method that does not disturb the wavefront state of the return light.

The second metric sensor (MS2) (high-power laser detector) 208B detects light intensity of the main laser light from the first deformable mirror 4 and the second deformable mirror 5 via the wavelength separating mirror 6 in the optical path of return light of the main laser on the return path side, and outputs a detected value. The detected value output from the second metric sensor 208B is input to the adaptive optical controller 231. The other aspects of the second metric sensor 208B are similar to that of the first metric sensor 208A, and thus the description thereof will be omitted.

The second light amount adjusting device (LAAD2) 213B (high-power laser light amount adjusting unit) is interposed between the wavelength separating mirror 6 and the second metric sensor 208B in the optical path of return light of the main laser on the return path side. The second light amount adjusting device 213B adjusts the light amount of the main laser having passed through the second light amount adjusting device 213B and is incident on the second metric sensor 208B. The other aspects of the second light amount adjusting device 213B are similar to that of the first light amount adjusting device 213A, and thus the description thereof will be omitted. It is to be noted that light between the second light amount adjusting device 213B and the high-power laser reflecting mirror 211 may be reflected off of optional mirrors 152 and 154.

The controller 210 controls oscillation of laser of the beacon laser oscillator 7 and the high-power laser oscillator 101. Further, the controller 210 controls the first light amount adjusting device 213A to adjust the amount of passing light based on a detected value received from the first metric sensor 208A, so as to make the light intensity of return light of the beacon laser incident on the first metric sensor 208A fall within a dynamic range (the maximum value and the minimum value of an amount of light distinguishable by a sensor) of the first metric sensor 208A. Furthermore, the controller 210 controls the second light amount adjusting device 213B to adjust the amount of passing light based on a detected value received from the second metric sensor 208B, so as to make light intensity of return light of the main laser incident on the second metric sensor 208B fall within a dynamic range of the second metric sensor 208B.

In Embodiment 1, although the light amount adjusting device is omitted in the illustrations, also in Embodiment 1 as in the present embodiment, a light amount adjusting device controlled by the controller 10 may be provided to be interposed between the wavelength separating mirror 6 and the metric sensor 8.

The adaptive optical controller 231 selects one of the first metric sensor 208A and the second metric sensor 208B, and controls the drive unit 22 (see FIG. 3) of the first deformable mirror 4 and the drive unit 27 (see FIG. 3) of the second deformable mirror 5 based on a detected value received from the selected metric sensor. The other aspects of the adaptive optical controller 231 are similar to that of the adaptive optical controller 31, and thus the description thereof will be omitted.

[Operation Example]

Next, an operation example of the optical system 200 will be described.

Figure 9:
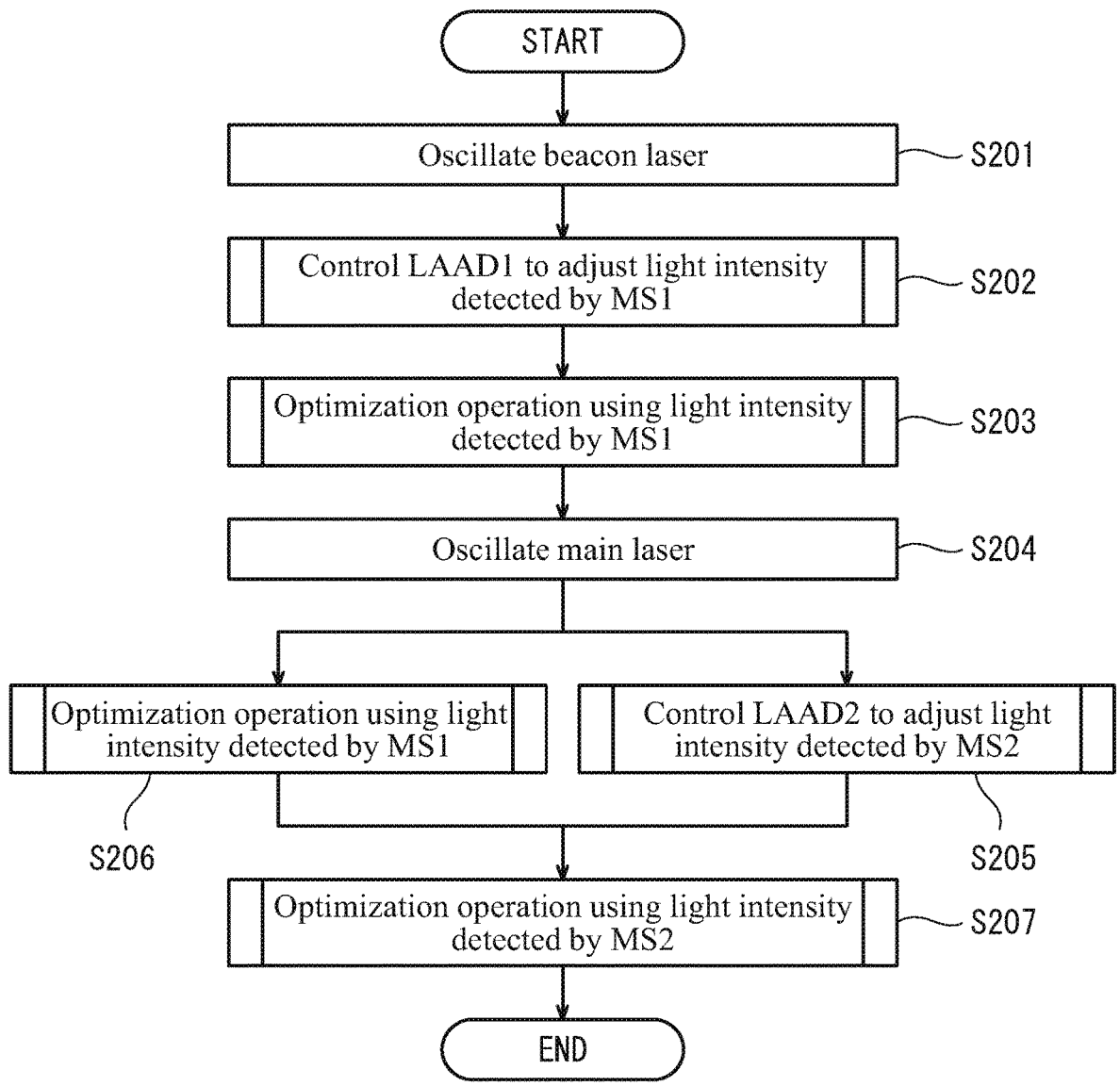
FIG. 9 is a flowchart illustrating an operation example of the optical system of FIG. 8.

FIG. 9 is a flowchart illustrating an operation example of the optical system 200.

First, in the controller 210, the beacon laser oscillator 7 oscillates laser light (beacon laser) (step S201). Then, the beacon laser is emitted to the outside of the optical system 200, propagates through the atmosphere, and reaches the irradiated object A. Thereafter, return light of the beacon laser reflected by the object A enters the optical system 200 as light having propagated through the atmosphere, and passes through the magnifying optical system 2, the fast steering mirror 3, the first deformable mirror 4, the second deformable mirror 5, the wavelength separating mirror 6, the first beam splitter 11, and the first light amount adjusting device 213A in this order and reaches the first metric sensor 208A, and the first metric sensor 208A detects a wavefront state of the reflected light affected by atmospheric fluctuations and outputs a detected value thereof.

Next, the controller 210 controls the first light amount adjusting device 213A to adjust the amount of light passing through the first light amount adjusting device 213A and adjust the light amount incident on the first metric sensor 208A based on a detected value output from the first metric sensor 208A, so as to make the light amount of return light of the beacon laser incident on the first metric sensor 208A fall within the dynamic range of the first metric sensor 208A (step S202).

Then, when the adjustment of the amount of light passing through the first light amount adjusting device 213A is completed, next, the adaptive optical controller 231 executes the optimization operation using the light intensity of laser light detected by the first metric sensor 208A (step S203). This optimization operation is similar to the optimization operation (steps S10 to S40) of above Embodiment 1 except that the first metric sensor 208A is used instead of the metric sensor 8 for evaluation of light intensity, and thus the detailed description thereof will be omitted.

Next, in addition to the beacon laser, the controller 210 causes the high-power laser oscillator 101 to oscillate laser light (main laser) (step S204). The main laser and the beacon laser are superimposed on the same optical path by passing through the wavelength separating mirror 6, and are emitted to the outside of the optical system 200. Then, the superimposed main laser and beacon laser are emitted to the outside of the optical system 200, propagate through the atmosphere, and reach the irradiated object A. Thereafter, return light of the main laser reflected by the object A enters the optical system 200 as light having propagated through the atmosphere, is guided by the wavelength separating mirror 6 to an optical path different from the optical path of the beacon laser, passes through the high-power laser reflecting mirror 211 with a light amount monitoring function and the second light amount adjusting device 213B in this order and reaches the second metric sensor 208B, and the second metric sensor 208B detects a wavefront state of the reflected light affected by atmospheric fluctuations and outputs a detected value.

Next, the controller 210 adjusts the amount of light passing through the second light amount adjusting device 213B and adjusts the light amount incident on the second metric sensor 208B based on the detected value output from the second metric sensor 208B, so as to make the light amount of return light of the main laser incident on the second metric sensor 208B fall within the dynamic range of the second metric sensor 208B (light amount adjusting operation, step S205).

Then, while the controller 210 adjusts the amount of light passing through the second light amount adjusting device 213B, the adaptive optical controller 231 continues to execute the optimization operation using the light intensity of return light of the beacon laser detected by the first metric sensor 208A (step S206). Since the beacon laser and the main laser are superimposed on the same optical path, the wavefront error of the main laser can be compensated for by compensating for the optical wavefront using the light intensity of return light of the beacon laser.

The light intensity of return light of the main laser varies depending on the distance to the irradiated object A, the surface reflectance of the irradiated object A, and the like. In the present embodiment, when starting irradiation of the main laser, the adaptive optical controller 231 continues to execute the optimization operation using the light intensity of the return light of the beacon laser detected by the first metric sensor 208A when starting irradiation of the main laser, and thus it is possible to compensate for an wavefront error of the main laser due to the influence of atmospheric fluctuations when starting irradiation of the main laser.

When the adjustment of the amount of light passing through the second light amount adjusting device 213B is completed, the adaptive optical controller 231 of the controller 210 performs a switching process to switch, in the first update operation, an operation of controlling the drive unit 27 of the second deformable mirror 5 based on a detected value by the first metric sensor 208A to change the uneven shape of the reflecting surface 26 of the second deformable mirror 5 to an operation of controlling the drive unit 27 of the second deformable mirror 5 based on a detected value by the second metric sensor 208B to change the uneven shape of the reflecting surface 26 of the second deformable mirror 5, so as to execute the optimization operation (step S207). That is, this optimization operation is similar to the optimization operation (steps S10 to S40) of above Embodiment 1 except that the second metric sensor 208B is used instead of the metric sensor 8 to evaluate of light intensity, and thus the detailed description thereof will be omitted.

In order to give commonality to disorder of the optical wavefront of the return light of the main laser reflected by the object A and disorder of the optical wavefront of the return light of the beacon laser reflected by the object A, it is necessary to superimpose the main laser accurately on the same optical path as the beacon laser, and as a deviation between the optical path of the main laser in the atmosphere and the optical path of the beacon laser in the atmosphere increases, compensation performance (Straul ratio) of the optical wavefront for the main laser using the light intensity of the beacon laser decreases. However, since the adaptive optical controller 231 executes the optimization operation using the light intensity of laser light detected by the second metric sensor 208B as soon as the adjustment of the amount of light passing through the second light amount adjusting device 213B is completed, compensation accuracy of the main laser can be enhanced.

Embodiment 3

An operation of an optical system of Embodiment 3 will be described below, focusing on differences from Embodiment 1.

[Operation Example]

Figure 10:
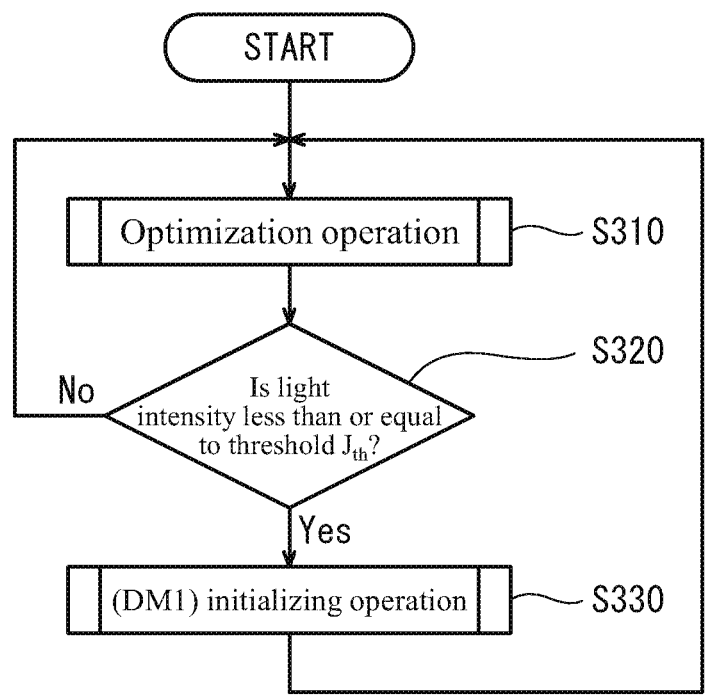
FIG. 10 is a flowchart illustrating an operation example of an optical system including an adaptive optical apparatus according to Embodiment 3.

FIG. 10 is a flowchart illustrating an operation example of the optical system of Embodiment 3.

In the present embodiment, the adaptive optical controller 31 of the optical system first executes the optimization operation in the operation example of Embodiment 1 (step 310).

Next, the adaptive optical controller 31 determines whether the light intensity detected by the metric sensor 8 is less than or equal to a predetermined threshold $J_{th}$ (step S320). The predetermined threshold $J_{th}$ is calculated, for example, according to the following equation (7).

$$J_{th} = J_0 \cdot k_a \quad (7)$$

Here, $J_0$ is a value of light intensity detected by the metric sensor 8 when the optimization operation is started, and $k_a$ is a predetermined coefficient (for example, 0.7).

Then, when the adaptive optical controller 31 determines that the light intensity detected by the metric sensor 8 is equal to or higher than the predetermined threshold $J_{th}$ (No in step S320), the adaptive optical controller 31 continues the optimization operation. On the other hand, when the adaptive optical controller 31 determines in step S320 that the light intensity of the reflected light affected by atmospheric fluctuations is less than or equal to the predetermined threshold $J_{th}$ (Yes in step S320), the adaptive optical controller 31 executes an initializing operation of the first deformable mirror 4 (second initializing operation) (step S330). The initializing operation of the first deformable mirror 4 is an operation of updating the uneven shape of the reflecting surface 26 of the first deformable mirror 4 to a predetermined initial shape (a shape when starting the first second update operation). As described above, the adaptive optical controller 31 repeatedly executes the optimization operation using the stochastic parallel gradient descent method to make the uneven shape of the reflecting surface of the deformable mirror to follow a change in atmospheric fluctuations. However, in the optimization operation, it may fall into a local optimum, that is, it may not be overall optimum but may be optimum in a certain local range, and if it falls into a local optimum, in some cases, the uneven shape of the reflecting surface of the deformable mirror cannot be changed so as to follow a change in atmospheric fluctuations, and the degree of concentration may be degraded. However, in the present embodiment, when the degree of concentration has deteriorated to a certain extent or more, that is, when the adaptive optical controller 31 determines that the light intensity detected by the metric sensor 8 is equal to or less than the predetermined threshold $J_{th}$, the adaptive optical controller 31 executes the initializing operation of the first deformable mirror 4. Thus, it is possible to recover from a state of falling into a local optimum, and it is possible to prevent a state that the degree of concentration has deteriorated from continuing. Then, the adaptive optical controller 31 continues the optimization operation.

Embodiment 4

A configuration and operation of an optical system 400 according to Embodiment 4 will be described below focusing on differences from Embodiment 1.

[Configuration]

Figure 11:
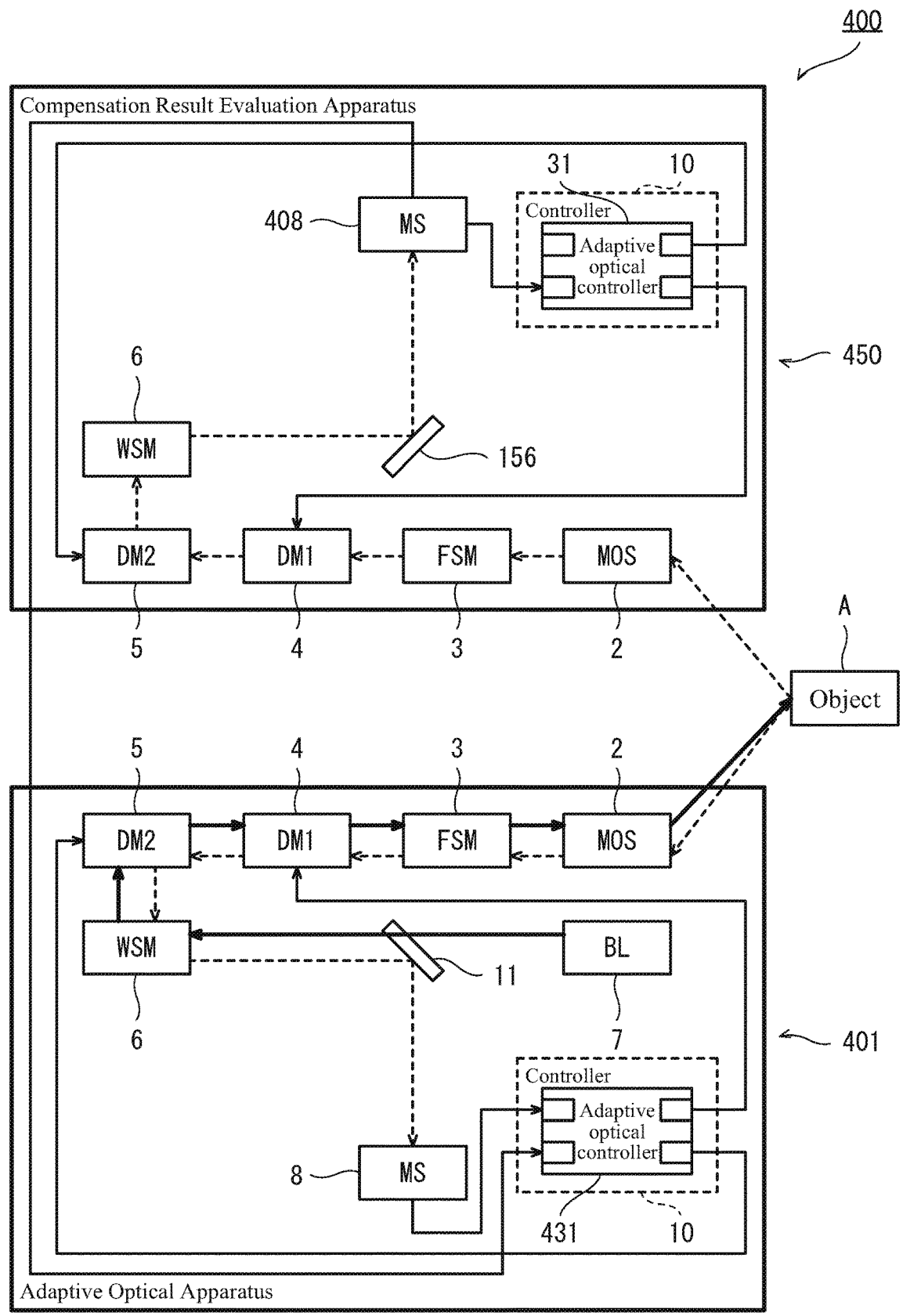
FIG. 11 is a block diagram illustrating a configuration example of an optical system including an adaptive optical apparatus according to Embodiment 4.

FIG. 11 is a block diagram illustrating a configuration example of the optical system 400 according to Embodiment 4.

The optical system 400 includes an adaptive optical apparatus 401 and a compensation result evaluation apparatus 450.

The adaptive optical apparatus 401 is similar to that of above Embodiment 1 except that an adaptive optical controller 431 is used instead of the adaptive optical controller 31, and thus the detailed description thereof will be omitted. Note that although the high-power laser oscillator 101, the second beam splitter 12, the tilt sensor 9, and the tip-tilt controller 32 are not illustrated in FIG. 11, they are configured similarly to those in above Embodiment 1.

The adaptive optical controller 431 controls the drive unit 22 (see FIG. 3) of the first deformable mirror 4 and the drive unit 27 of the second deformable mirror 5 of the adaptive optical apparatus 401 based on a detected value received from a metric sensor 408 of the compensation result evaluation apparatus 450 described later, in addition to a detected value received from the metric sensor 8. The other aspects of the adaptive optical controller 431 are similar to that of the adaptive optical controller 31, and thus the description thereof will be omitted.

The compensation result evaluation apparatus 450 is an apparatus that detects light emitted from a beacon laser oscillator 7 of the adaptive optical apparatus 401, compensated for an optical wavefront and emitted, and reflected by an irradiated object A, and that detects and outputs an evaluation amount for evaluating the degree of compensation for atmospheric fluctuations of an optical path on an outgoing path side by the adaptive optical apparatus 401. The compensation result evaluation apparatus 450 does not include the beacon laser oscillator 7 and the high-power laser oscillator 101. Further, a first metric sensor 408 is provided instead of the first metric sensor 8. Then, the evaluation amount for evaluating the degree and state of compensation is, for example, a beam diameter of the beacon laser on the irradiated object A. In this case, the metric sensor 408 of the compensation result evaluation apparatus 450 may be, for example, an image sensor. It is to be noted that light between the wavelength separating mirror 6 and the first metric sensor 408 may be reflected off of optional mirror 156. Then, an image output of this image sensor is image-processed, and the beam diameter of the beacon laser on the irradiated object A is calculated. Then, this beam diameter is output as an evaluation amount $J_e$. The evaluation amount $J_e$ output from the metric sensor 408 is input not only to the adaptive optical controller 31 of the compensation result evaluation apparatus 450 but also to the adaptive optical controller 31 of the adaptive optical apparatus 401. The configuration of the other compensation result evaluation apparatus 450 is similar to that of the adaptive optical apparatus 401, and thus the description thereof will be omitted.

[Operation Example]

Next, an operation example of the optical system 400 will be described.

First, when the beacon laser oscillator 7 of the adaptive optical apparatus 401 oscillates laser light, the oscillated laser light is emitted to the outside of the optical system 100, propagates through the atmosphere, and reaches the irradiated object A.

Then, part of laser light reflected by the irradiated object A enters the adaptive optical apparatus 401 as light having propagated through the atmosphere and reaches the metric sensor 8 of the adaptive optical apparatus 401, and the metric sensor 8 of the adaptive optical apparatus 401 detects light intensity of the reflected light. At the same time, part of the laser light reflected by the irradiated object A enters the compensation result evaluation apparatus 450 as light having propagated through the atmosphere and reaches the metric sensor (detector for evaluation) 408, and the metric sensor 408 detects an evaluation amount $J_e$ of a compensation result by the adaptive optical apparatus 401.

Then, the adaptive optical controller (controller for evaluation) 31 of the compensation result evaluation apparatus 450 repeatedly executes the optimization operation by using an optimization method that repeatedly changes the uneven shape of the reflecting surface of the deformable mirror (deformable mirror for evaluation) using the evaluation amount $J_e$ of the metric sensor 408 of the compensation result evaluation apparatus 450 as an evaluation function. This optimization operation is an operation (imaging operation) of changing the uneven shape of the reflecting surface of the deformable mirror so that the evaluation amount $J_e$ improves, that is, the beam diameter which is the evaluation amount $J_e$ detected by the metric sensor 408 is minimized. Since the imaging operation is similar to the optimization operation of above Embodiment 1, the detailed description thereof will be omitted. Thus, the compensation result evaluation apparatus 450 can reduce errors of the evaluation amount of the compensation result caused by disturbance of an optical wavefront due to atmospheric fluctuations of the optical path on the return path side from the irradiated object A to the compensation result evaluation apparatus 450 from the evaluation amount $J_e$ of the compensation result by the adaptive optical apparatus 401, and the evaluation amount of the compensation result on the outgoing path side of the adaptive optical apparatus 401 having optical paths different from those of the compensation result evaluation apparatus 450 can be more reliably detected by the metric sensor 408 even when it is strongly influenced by the disturbance of the optical wavefront due to atmospheric fluctuations of the optical path on the return path side.

Then, in parallel with the optimization operation of the compensation result evaluation apparatus 450, the adaptive optical controller 431 of the adaptive optical apparatus 401 executes the optimization operation. In the optimization operation in above Embodiment 1, the gain G in the equation (4) is a predetermined value (constant). On the other hand, in the present embodiment, the gain G in equation (4) is a value calculated based on the metric sensor 408 of the compensation result evaluation apparatus 450, and is a variable calculated according to, for example, the following equation (8).

$$G = -dJ_e/dt \cdot k_b + k_c \qquad (8)$$

Here, $k_b$ and $k_c$ are predetermined coefficients.

Therefore, in the present embodiment, the gain G takes a large value when the amount of change in the evaluation amount detected by the metric sensor 408 of the compensation result evaluation apparatus 450 is large in a desired direction, and the gain G takes a small value when the amount of change in the evaluation amount is large in an undesired direction. Here, when the evaluation amount is the beam diameter of the beacon laser on the irradiated object A, one in which it becomes smaller is a desirable direction, and thus the first term of the equation (8) has a minus sign. Further, if there is no change in the evaluation amount, it is determined that the compensation is stabilized, and the fixed gain value G=$k_c$ illustrated in the equation (3) of above Embodiment 1 is taken. Thus, in the present embodiment, the adaptive optical controller 431 of the adaptive optical apparatus 401 uses a detected value of the metric sensor 408 of the compensation result evaluation apparatus 450 as a secondary evaluation function. Consequently, in the initial stage of the optimization operation or when a large atmospheric fluctuation occurs in a short time, the shape change amount of the second deformable mirror 5 can be increased, convergence of the reflecting surface 26 of the second deformable mirror 5 to the optimum shape can be accelerated, and a compensation control speed can be improved. On the other hand, in a state that the reflecting surface 26 of the second deformable mirror 5 is converging to the optimum shape, the shape change amount of the reflecting surface 26 of the second deformable mirror 5 can be reduced, and it is possible to prevent the degree of concentration from being conversely deteriorated by changing the reflecting surface 26 exceeding the optimum shape.

In addition, if the optical wavefront on the return path side detected by the metric sensor 8 of the adaptive optical apparatus 401 originally comes as a point light source from the irradiated object A, only a wavefront distortion due to atmospheric fluctuations can be detected. However, in practice, since it becomes a wavefront of superposition of reflected light from finite areas in different surface states of the irradiated object A, the influence of a speckle pattern generated thereby cannot be ignored, and in some cases, disturbance of the optical wavefront on the outgoing path side not including the influence of reflection on the irradiated object A and disturbance of the optical wavefront on the return path side including the influence of reflection on the irradiated object A are largely different. In such cases, even if the reflected light is evaluated by the metric sensor 8 of the adaptive optical apparatus 401, and a compensation operation of correcting the wavefront distortion is performed on the optical path on the return path side, there are cases where it is not possible to perform compensation so as to cancel out a wavefront distortion effect due to atmospheric fluctuations on the optical path on the outgoing path side, and light collection performance cannot be increased. However, in the present embodiment, for the purpose of reducing the influence of reflecting state of the irradiated object A, the metric sensor 408 of the compensation result evaluation apparatus 450 detects the evaluation amount of a result of correcting the influence of disturbance of the optical wavefront due to atmospheric fluctuations of the optical path on the outgoing path side, and the adaptive optical apparatus 401 performs the optimization operation using this as a secondary evaluation function. Thus, it is possible to more reliably enhance light collection performance of laser light.

Embodiment 5

The following describes a configuration and operation of an optical system 500 including an adaptive optical apparatus 501 according to Embodiment 5, focusing on differences from Embodiment 1.

[Configuration]

Figure 12:
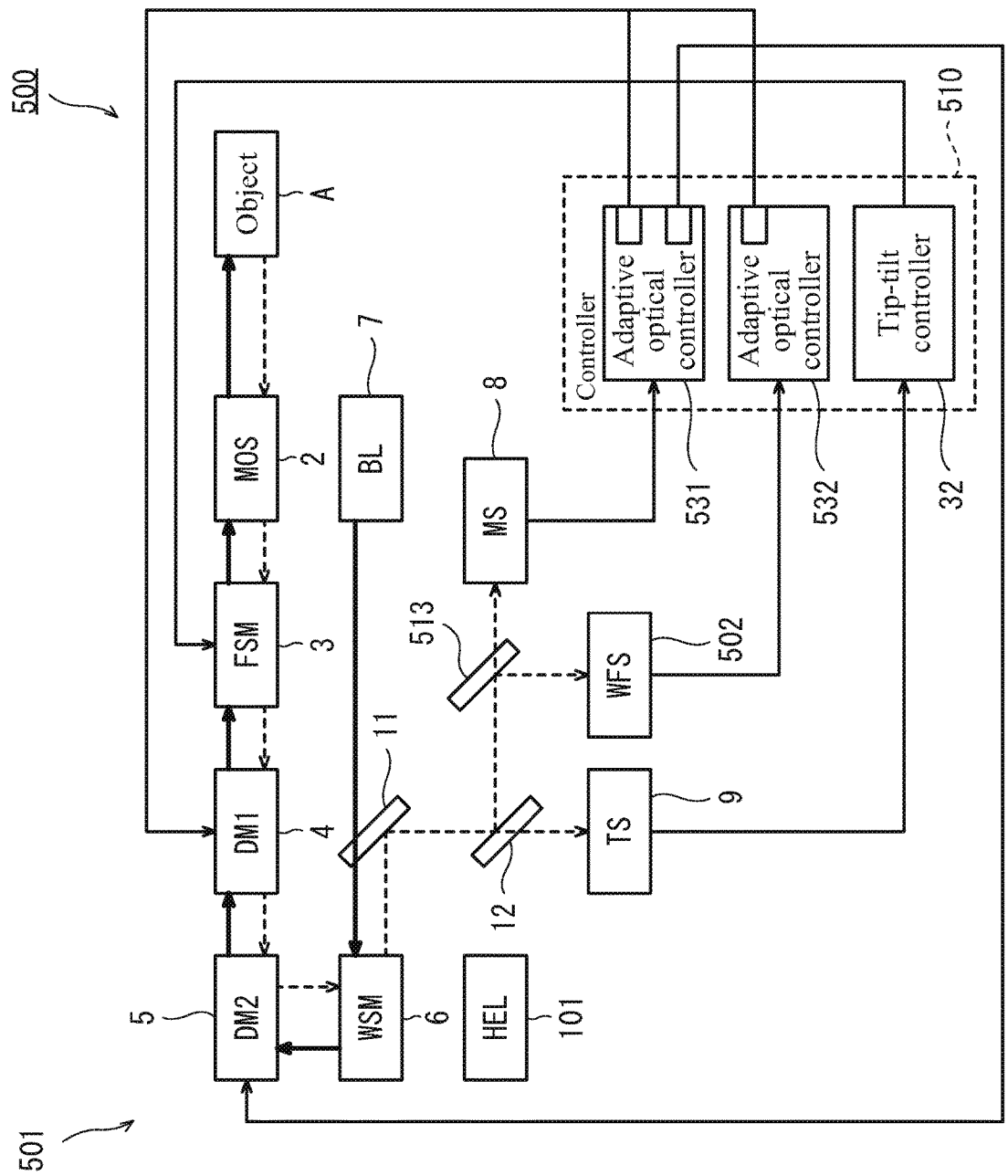
FIG. 12 is a block diagram illustrating a configuration example of an optical system including an adaptive optical apparatus according to Embodiment 5.

FIG. 12 is a block diagram illustrating a configuration example of the optical system 500 according to Embodiment 5.

The adaptive optical apparatus 501 includes a magnifying optical system 2, a fast steering mirror 3, a first deformable mirror 4, a second deformable mirror 5, a wavelength separating mirror 6, a beacon laser oscillator 7, a metric sensor 8, a tilt sensor 9, a wavefront sensor 502, a controller 510, a first beam splitter 11, a second beam splitter 12, and a third beam splitter 513. The magnifying optical system 2, the fast steering mirror 3, the first deformable mirror 4, the second deformable mirror 5, the wavelength separating mirror 6, the beacon laser oscillator 7, the metric sensor 8, the tilt sensor 9, the first beam splitter 11, and the second beam splitter 12 are configured similarly to those in above Embodiment 1, and thus the detailed description thereof will be omitted.

The wavefront sensor (WFS wavefront shape detector) 502 is a sensor that detects a wavefront shape of laser light and outputs a detected value. The wavefront sensor 502 is, for example, the aforementioned Shack-Hartmann wavefront sensor.

The controller 510 includes a first adaptive optical controller 531, a second adaptive optical controller 532, and a tip-tilt controller 32.

The first adaptive optical controller 531 is a controller that is configured similarly to the controller 10 of above Embodiment 1, and performs compensation using an optimization method to repeatedly change the uneven shape of the reflecting surface of the deformable mirror using a detected value of the metric sensor 8 as an evaluation function. In addition, since the tip-tilt controller 32 is similar to that of above Embodiment 1, the detailed description thereof will be omitted. Further, since the other aspects of the controller 510 are similar to that of the controller 10 of above Embodiment 1, the description thereof will be omitted.

The second adaptive optical controller 532 controls the drive unit 22 of the first deformable mirror 4 based on a wavefront shape received from the wavefront sensor 502. Further, the second adaptive optical controller 532 is configured to be able to execute a wavefront correction operation (details will be described later). The second adaptive optical controller 532 outputs a control signal to the first deformable mirror 4.

The third beam splitter 513, similar to the first beam splitter 11 and the second beam splitter 12, partially reflects incident light and transmit remaining light thereof so as to split laser light into different optical paths, or merge (superimpose) optical paths of a plurality of laser lights of different optical paths into one optical path. The third beam splitter 513 is provided on an optical path between the second beam splitter 12 and the metric sensor 8, and partially reflects, in an optical path on a return path side, laser light incident from the second beam splitter 12, and reflected laser light is incident on the wavefront sensor 502. The third beam splitter 513 transmits the remaining laser light, and the transmitted laser light is incident on the metric sensor 8.

That is, in the present embodiment, the optical path on the return path side runs through the magnifying optical system 2, the fast steering mirror 3, the first deformable mirror 4, the second deformable mirror 5, the wavelength separating mirror 6, and the first beam splitter 11 in this order and reaches the second beam splitter 12, and is split in the second beam splitter 12 into an optical path toward the tilt sensor 9 and an optical path toward the third beam splitter 513. Furthermore, in the third beam splitter 513, the optical path is split into an optical path toward the metric sensor 8 and an optical path toward the wavefront sensor 502.

[Operation Example]

Figure 13:
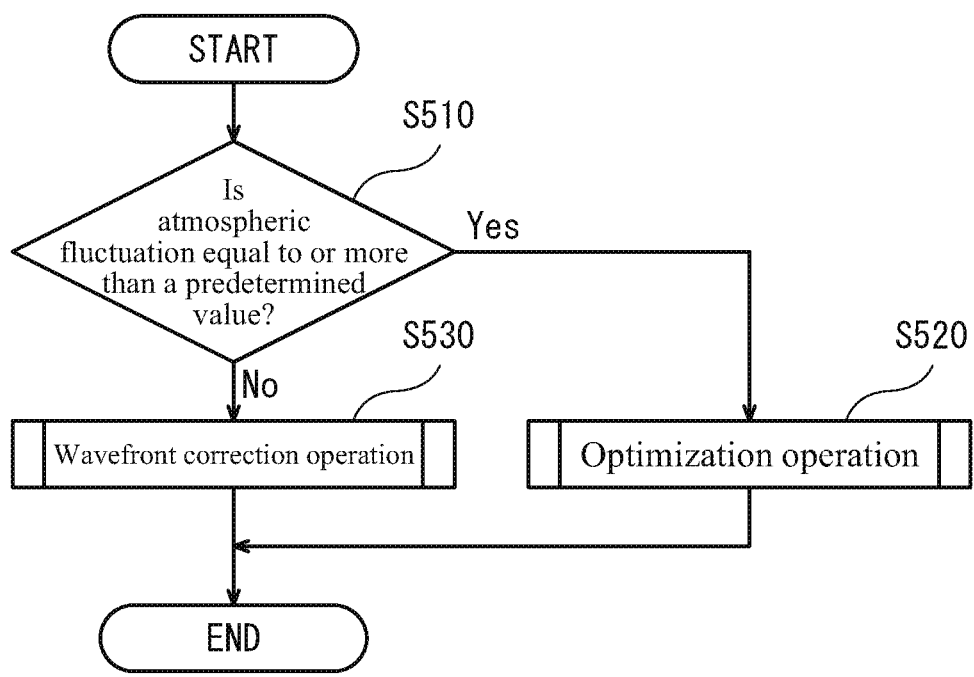
FIG. 13 is a flowchart illustrating an operation example of the optical system of FIG. 12.

Next, an operation example of the optical system 500 will be described. FIG. 13 is a flowchart illustrating an operation example of the optical system 500.

First, the controller 510 determines which of the optimization operation and the wavefront correction operation is to be performed according to the intensity of atmospheric fluctuations (step S510). For example, when the controller 510 determines that it is under strong atmospheric fluctuation conditions such that a Rytov number (logarithmic amplitude dispersion) which can be calculated from a measurement value of the metric sensor 8 exceeds 0.2 (Rytov number is 0.2 or more) (Yes in step S510), the controller 510 determines to perform the optimization operation (steps S520). The optimization operation in the present embodiment is similar to the optimization operation (steps S10 to S40) of above Embodiment 1, and thus the detailed description thereof will be omitted.

Further, when the controller 510 determines that it is under weak atmospheric fluctuation conditions such that the Rytov number is below 0.2 (Rytov number is less than 0.2) (No in step S510), the controller 510 determines to perform the wavefront correction operation (third update operation), and performs the wavefront correction operation (step S530). In the wavefront correction operation, the controller 510 sets the shape of the reflecting surface 26 of the second deformable mirror 5 to a predetermined initial shape. The predetermined initial shape is, for example, a flat surface. At the same time, the second adaptive optical controller 532 of the controller 510 controls the drive unit 22 of the first deformable mirror 4 to change the uneven shape of the reflecting surface 21 of the first deformable mirror 4 so as to correct the wavefront distortion based on the wavefront shape of laser light detected by the wavefront sensor 502.

As described above, in the present embodiment, the optical system 500 is configured to properly use, depending on the situation, both of the optimization operation using the optimization method and the wavefront correction operation that directly detects a shape of an optical wavefront, and corrects a detected optical wavefront distortion. In this manner, under conditions where atmospheric fluctuations are weak and there is no possibility that a large step-like component is generated in the optical wavefront, or the like, a wavefront distortion due to the influence of atmospheric fluctuations is measured by a wavefront sensor and is fed back directly to the deformable mirror for correction by the wavefront correction operation. Thus, a margin can be added to the processing speed.

Embodiment 6

A configuration and operation of an optical system 600 including an adaptive optical apparatus 601 according to Embodiment 6 will be described below, focusing on differences from Embodiment 1.

[Configuration]

Figure 14:
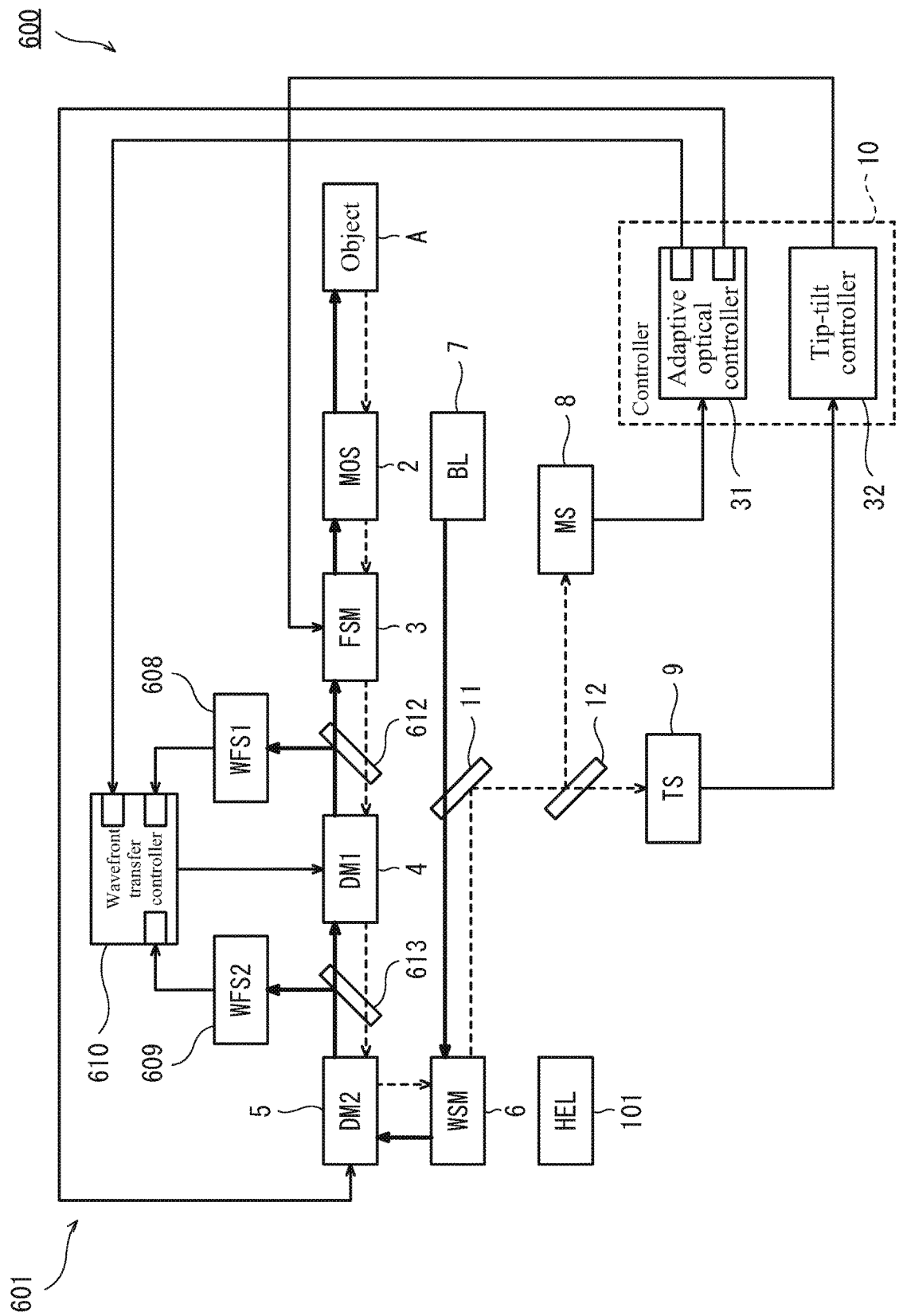
FIG. 14 is a block diagram illustrating a configuration example of an optical system including an adaptive optical apparatus according to Embodiment 6.

FIG. 14 is a block diagram illustrating a configuration example of the optical system 600 according to Embodiment 6.

The adaptive optical apparatus 601 further includes a first wavefront sensor 608, a second wavefront sensor 609, a first beam sampler 612, a second beam sampler 613, and a wavefront transfer controller 610 in addition to the adaptive optical apparatus 1 of above Embodiment 1. The described samplers may be implemented to have the structure and function of a splitter. In one exemplary implementation, the samplers may take out very weak light as a sample. The first and second wavefront sensors 608 and 609 each measure a difference between wavefronts.

The first beam sampler 612 is provided in an optical path between the fast steering mirror 3 and the first deformable mirror 4, and takes out a part of the beacon laser light on the outgoing path side toward the first wavefront sensor 608. Further, the second beam sampler 613 is provided in the optical path between the first deformable mirror 4 and the second deformable mirror 5, and takes out a part of the beacon laser light on the outgoing path side toward the second wavefront sensor 609.

The first wavefront sensor (WFS1) 608 and the second wavefront sensor (WFS2) 609 are sensors detecting a wavefront shape of laser light, and are, for example, the above-mentioned Shack-Hartmann wavefront sensors. The first wavefront sensor 608 receives beacon laser light extracted by the first beam sampler 612, that is, beacon laser light having passed through the first deformable mirror 4 and the second deformable mirror 5 and having a wavefront deformed by the first deformable mirror 4 and the second deformable mirror 5, detects the wavefront thereof, and outputs a detected value. From the detected wavefront, it is possible to calculate a shape in which the uneven shape of the reflecting surface 26 of the second deformable mirror 5 is superimposed on the uneven shape of the reflecting surface 21 of the first deformable mirror 4. Further, the second wavefront sensor 609 receives the beacon laser light extracted by the second beam sampler 613, that is, the beacon laser beam having a wavefront deformed by the second deformable mirror 5, detects the wavefront thereof, and outputs a detected value. The uneven shape of the reflecting surface 26 of the second deformable mirror 5 can be calculated from the detected wavefront.

The wavefront transfer controller 610 controls the drive unit 22 of the first deformable mirror 4 based on a control signal for the first deformable mirror 4 output from the adaptive optical controller 31 and the wavefront detected by the first wavefront sensor 608 and the second wavefront sensor 609. The drive unit 22 (see FIG. 3) of the first deformable mirror 4 operates each drive element 23 (see FIG. 3) based on a drive signal received from the wavefront transfer controller 610. The wavefront transfer controller 610 may be configured integrally with the adaptive optical controller 31 and the tip-tilt controller 32 of the controller 10.

[Operation Example]

Next, an operation example of the optical system 600 will be described.

Figure 15:
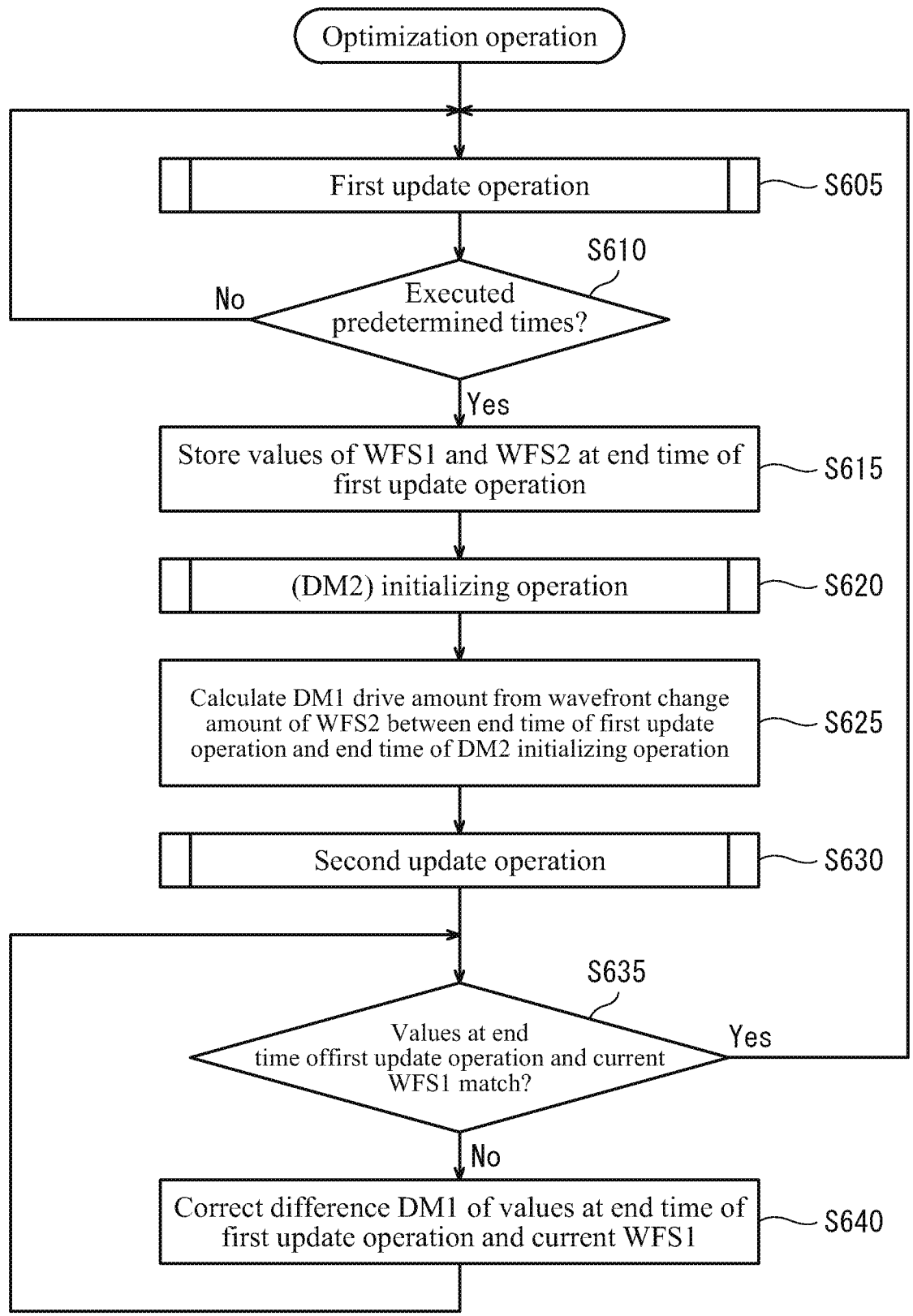
FIG. 15 is a flowchart illustrating an operation example of the optical system of FIG. 14.
Figure 16:
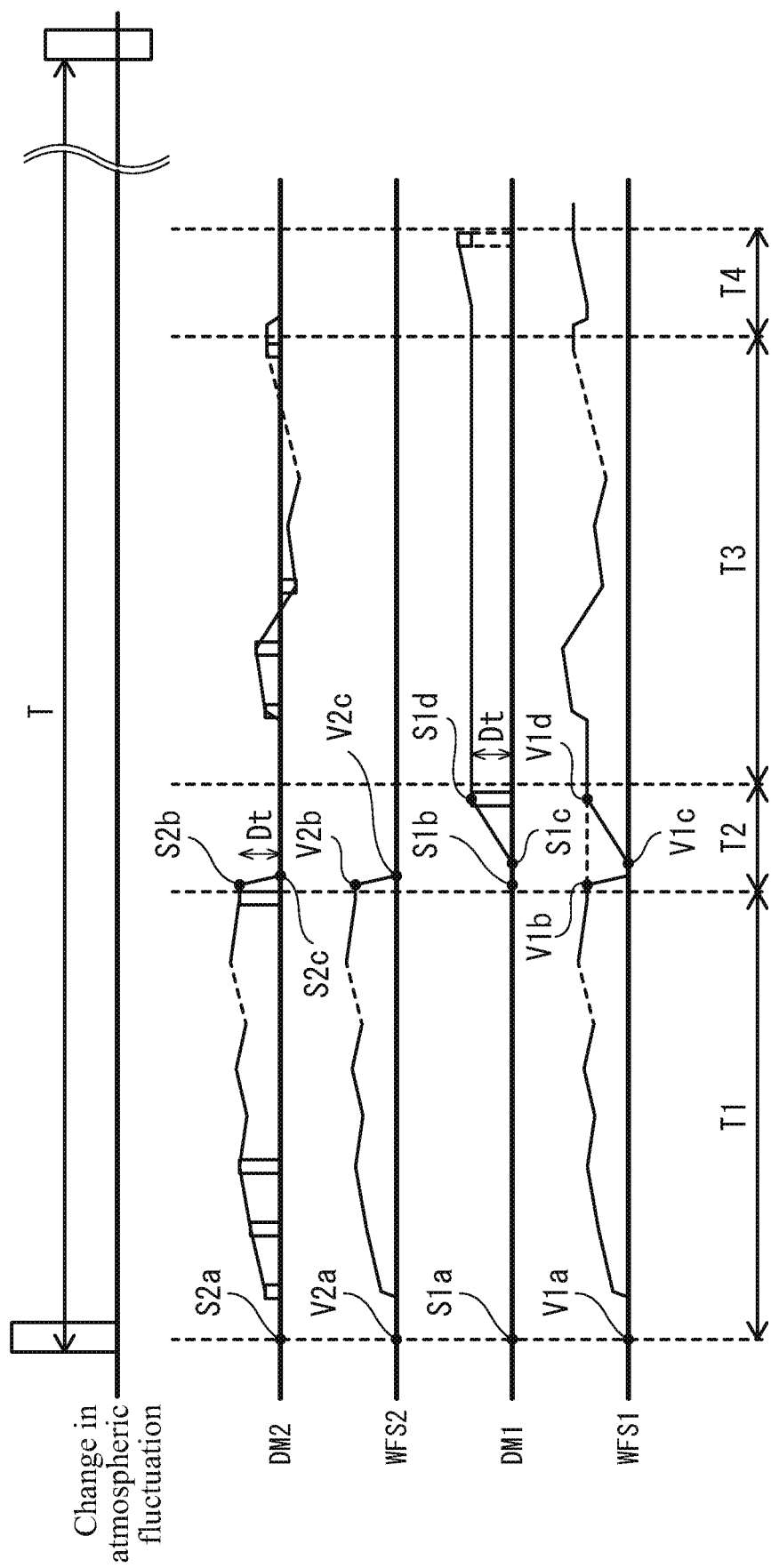
FIG. 16 is a time chart illustrating an operation example of an optimization operation of the optical system of FIG. 14.

FIG. 15 is a flowchart illustrating an operation example of the optical system 600. FIG. 16 is a time chart illustrating an operation example of an optimization operation of the optical system 600.

The optimization operation of the optical system 100 of above Embodiment 1 and the optimization operation of the optical system 600 of the present embodiment are different in the operation after step S20.

In the present embodiment, when the adaptive optical controller 31 executes a first update operation (step S605) a predetermined number of times (Yes in step S610), the wavefront transfer controller 610 stores a detected value V2b detected by the second wavefront sensor 609. This detected value V2b is a value reflecting the shape change amount S2b-S2a from an uneven shape S2a of the reflecting surface 26 of the second deformable mirror 5 before the first update operation to an uneven shape S2b of the reflecting surface 26 of the second deformable mirror 5 after the first update operation. At the same time, the wavefront transfer controller 610 stores a detected value V1b detected by the first wavefront sensor 608. The detected value V1b is a value reflecting the wavefront shape obtained by superposing the uneven shape S1a (=S1b) of the reflecting surface 21 of the first deformable mirror 4, which has no change in the first update operation, on the uneven shape S2b of the reflecting surface 26 of the second deformable mirror 5 after the first update operation (step S615).

Next, the adaptive optical controller 31 executes an initializing operation of the second deformable mirror 5 (step S620). The initializing operation of the second deformable mirror 5 is similar to the initializing operation of the second deformable mirror 5 in the operation example of above Embodiment 1, and thus the detailed description thereof will be omitted.

Next, the wavefront transfer controller 610 uses the detected value V2b of the wavefront state of the second wavefront sensor 609 after completion of the first update operation stored in step S615 and a current detected value V2c, so as to calculate from V2b-V2c the drive amount corresponding to a shape deformation amount Dt to be commanded to the drive element 23 of the first deformable mirror 4 to drive (step S625). Here, if a detected value V2a of the wavefront state of the second wavefront sensor 609 before the first update operation and the detected value V2c of the wavefront state after the initializing operation are completely the same, the shape deformation amount Dt described above becomes the same as the shape deformation amount D calculated from V2b-V2a. However, they often do not match completely because the drive elements of the deformable mirror have hysteresis characteristics. However, by using the shape deformation amount Dt which is a shape difference with reference to the current V2c, it is possible to precisely carry out wavefront transfer so as to maintain the wavefront before and after transfer.

Next, the wavefront transfer controller 610 adds the shape change amount Dt to the uneven shape S1c of the reflecting surface 21 of the first deformable mirror 4 to update the uneven shape of the reflecting surface 21 of the first deformable mirror 4 (second update operation, step S630). Specifically, first, the adaptive optical controller 31 operates the drive element 23 so that the reflecting surface 21 of the first deformable mirror 4 exhibits a post-update shape.

Next, the wavefront transfer controller 610 obtains the detected value V1d of the first wavefront sensor 608, and compares it with the detected value V1b of the first wavefront sensor 608 obtained in step S615 (step S635). Then, if the difference between the detected values V1b and V1d exceeds a predetermined threshold, that is, if they do not match (No in step S635), the uneven shape of the reflecting surface 21 of the first deformable mirror 4 is corrected based on the difference between the detected values V1b and V1d. Then, step S635 is executed again, and the uneven shape S1d of the first deformable mirror 4 is corrected until the detected value V1d matches the detected value V1b (steps S635 to S640).

When the wavefront transfer controller 610 determines that the detected value V1d matches the detected value V1b (Yes in step S635), step S605 is executed again. That is, the wavefront transfer controller 610 changes the uneven shape of the first deformable mirror 4 (reflecting surface correction operation) so that the detected value V1b before starting the initializing operation and the second update operation matches the detected value V1d after completing the initializing operation and the second update operation.

As described above, in the present embodiment, the optical system 600 can accurately add the shape difference Dt of the reflecting surface 26 of the second deformable mirror 5 between an end time of the first update operation and an end time of the initializing operation to the uneven shape S1a of the reflecting surface 21 of the first deformable mirror 4 based on detected values of the first wavefront sensor 608 and the second wavefront sensor 609.

As illustrated in the above operation example, essentially, the wavefront detection for transferring the wavefront shape change amount of the first update operation by the second deformable mirror 5 by the shape change by the first deformable mirror 4 is also possible by the first wavefront sensor 608 alone. However, a wavefront detected value by the first wavefront sensor 608 requires a dynamic range because a shape change due to the first update operation is accumulated. On the other hand, since the second deformable mirror 5 is initialized in every first update operation, the shape change amount of the wavefront is small, and the second wavefront sensor 609 immediately after that can suppress a dynamic range small, and it is possible to detect the shape change amount of the wavefront more accurately. Therefore, since calculation of the drive amount of the first deformable mirror 4 driven after the initializing operation based on a detected value of the second wavefront sensor 609 becomes precise, step S635 of matching the detected value V1d of the first wavefront sensor 608 with the detected value V1b can be completed in a shorter time, which contributes to speeding up of the compensation operation.

As described above in Embodiments 1 to 6, the adaptive optical apparatus includes a first deformable mirror that includes a reflecting surface reflecting light having propagated through an atmosphere and a drive unit having a plurality of drive elements and changing an uneven shape of the reflecting surface, a second deformable mirror that includes a reflecting surface reflecting the light from the first deformable mirror and a drive unit having a plurality of drive elements and changing an uneven shape of the reflecting surface, a detector that detects light intensity of the light from the first deformable mirror and the second deformable mirror, and a controller that controls the drive unit of each of the first deformable mirror and the second deformable mirror, in which the controller is configured to be capable of executing a first update operation of controlling the drive unit of one deformable mirror of the first deformable mirror and the second deformable mirror based on a detected value by the detector, so as to change the uneven shape of the reflecting surface of the one deformable mirror, and a second update operation of controlling the drive unit of the other deformable mirror of the first deformable mirror and the second deformable mirror based on a shape change amount of the reflecting surface of the one deformable mirror from a predetermined initial shape by repeatedly executing the first update operation a predetermined number of times, so as to change the uneven shape of the reflecting surface of the other deformable mirror.

With this configuration, the control speed of the adaptive optical apparatus using the optimization method can be improved, the optimization method can be applied to compensation for a high-order optical wavefront following changes in fluctuations under conditions where atmospheric fluctuations are strong, and the compensation for the high-order optical wavefront can be accurately performed.

A maximum displacement of the drive elements of the one deformable mirror may be smaller than a maximum displacement of the drive elements of the other deformable mirror.

With this configuration, the first update operation can be repeatedly executed at high speed using the deformable mirror capable of performing high-speed operation by setting the maximum displacement amount small. Thus, the compensation operation speed for the optical wavefront using the optimization method can be improved.

The controller may update the uneven shape of the reflecting surface of the one deformable mirror to the initial shape at a timing of executing the second update operation.

With this configuration, the compensation for the optical wavefront using the first deformable mirror and the second deformable mirror can be appropriately configured.

The controller may be configured to be capable of executing a first initializing operation of updating the uneven shape of the reflecting surface of the one deformable mirror to the initial shape at a timing of executing the second update operation, and a second initializing operation of updating, if it is determined that the detected value by the detector is equal to or less than a predetermined threshold after executing the first initializing operation, the uneven shape of the reflecting surface of the other deformable mirror to a predetermined initial shape.

With this configuration, it is possible to recover from a state of falling into a local optimum, and it is possible to prevent a state in which the degree of concentration has deteriorated from continuing.

The adaptive optical apparatus may further include a laser oscillator that oscillates laser light, in which the detector may detect light intensity of the laser light having passed through an optical path on an outgoing path side in which the oscillated laser light passes through the second deformable mirror and the first deformable mirror in this order and is emitted to an outside and reaches an irradiated object as light having propagated through the atmosphere, and an optical path on a return path side which the laser light reflected by the irradiated object enters as light having propagated through the atmosphere and passes through the first deformable mirror and the second deformable mirror in this order, and an optical path of a section between the second deformable mirror and the irradiated object of the optical path on the outgoing path side and an optical path of a section between the second deformable mirror and the irradiated object of the optical path on the return path side may be the same path.

With this configuration, by performing a compensation operation for correcting the influence of atmospheric fluctuations on the return path side, similar compensation can be performed on the outgoing path side.

The adaptive optical apparatus may further include a high-power laser oscillator that oscillates high-power laser light having a power higher than that of the laser light, and a high-power laser detector that detects light intensity of the high-power laser light oscillated from the high-power laser oscillator and having passed through the optical path on the outgoing path side and the optical path on the return path side, and a high-power laser light amount adjusting unit that adjusts a light amount of the high-power laser light incident on the high-power laser detector, in which the controller may control the high-power laser light amount adjusting unit, and may be configured to be capable of executing a light amount adjusting operation executed during execution of at least one operation of the first update operation and the second update operation, and adjusting a light amount of the high-power laser light incident on the high-power laser detector, so as to make light intensity of the high-power laser light detected by the high-power laser detector fall within a dynamic range of the high-power laser detector, and a switching operation, executed after the light amount adjusting operation is completed, of switching in the first update operation an operation of controlling the drive unit of the one deformable mirror based on a detected value by the detector, so as to change the uneven shape of the reflecting surface of the one deformable mirror, to an operation of controlling the drive unit of the one deformable mirror based on a detected value by the high-power laser detector, so as to change the uneven shape of the reflecting surface of the one deformable mirror.

With this configuration, it is possible to compensate for a wavefront error due to the influence of atmospheric fluctuations of the high power laser when starting high power laser irradiation. Further, compensation accuracy of the high power laser can be enhanced.

The adaptive optical apparatus may further include a wavefront sensor that detects a wavefront of the laser light oscillated from the laser oscillator and having passed through the second deformable mirror and the first deformable mirror in the optical path on the outgoing path side, in which the controller may be configured to be capable of executing an initializing operation of updating the uneven shape of the reflecting surface of the one deformable mirror to the initial shape at a timing of executing the second update operation, and a reflecting surface correction operation of changing the uneven shape of the reflecting surface of the other deformable mirror after completing the initializing operation so that a shape of an optical wavefront of the laser light detected by the wavefront sensor before starting the initializing operation and the second update operation matches a shape of the optical wavefront of the laser light detected by the wavefront sensor after completing the initializing operation and the second update operation.

With this configuration, a shape difference of the reflecting surface of the second deformable mirror between an end time of the first update operation and an end time of the initializing operation can be accurately added to the uneven shape of the reflecting surface of the first deformable mirror.

The adaptive optical apparatus may further include a wavefront shape detector that detects a wavefront shape of the light from the first deformable mirror and the second deformable mirror, in which the controller may be configured to be capable of executing a third update operation of controlling the drive unit of one deformable mirror of the first deformable mirror and the second deformable mirror based on a detected value by the wavefront shape detector, so as to change the uneven shape of the reflecting surface of the one deformable mirror, and may execute the first update operation and the second update operation when the controller determines that intensity of atmospheric fluctuations is equal to or higher than a predetermined value, and may execute the third update operation when the controller determines that the intensity of the atmospheric fluctuations is less than the predetermined value.

With this configuration, under conditions where atmospheric fluctuations are weak and there is no possibility that a large step-like component is generated in the optical wavefront, or the like, an optical wavefront is compensated by the wavefront correction operation, and thus a margin can be added to the processing speed.

In the first update operation for an n-th (n is an integer of 1 or more) time, the controller may change the uneven shape of the reflecting surface of the one deformable mirror from a shape before starting the first update operation for the n-th time to a first shape and obtain light intensity detected by the detector, change the uneven shape of the reflecting surface of the one deformable mirror to a second shape that is symmetrical to the first shape with respect to a shape when starting the first update operation for the n-th time and obtain light intensity detected by the detector, and change the uneven shape of the reflecting surface of the one deformable mirror toward one shape of the first shape and the second shape that has higher light intensity detected by the detector, so as to update the uneven shape of the one deformable mirror.

With this configuration, it is possible to appropriately compensate for an optical wavefront using the optimization method.

The first shape may be a shape defined by adding a shape change amount randomly selected in every time of the first update operation on a plurality of the drive units constituting the one deformable mirror to a shape when starting the first update operation for the n-th time.

With this configuration, it is possible to effectively prevent falling into a local optimum in compensation of the optical wavefront using the optimization method.

Further, an optical system includes the adaptive optical apparatus and a compensation result evaluation apparatus, in which the compensation result evaluation apparatus includes a deformable mirror for evaluation that includes a reflecting surface and a drive unit having a plurality of drive elements and changing an uneven shape of the reflecting surface, a detector for evaluation that detects the laser light reflected by the irradiated object, incident as light having propagated through the atmosphere and passed through an optical path passing through the deformable mirror for evaluation, and detects an evaluation amount of evaluating a degree of compensation for atmospheric fluctuations of the optical path on the outgoing path side by the adaptive optical apparatus, and a controller for evaluation that controls the drive unit of the deformable mirror for evaluation, in which the controller for evaluation is configured to be capable of executing an imaging operation of changing the uneven shape of the reflecting surface of the deformable mirror for evaluation so that the evaluation amount detected by the detector for evaluation improves, and the first update operation is an operation of controlling the drive unit of one deformable mirror of the first deformable mirror and the second deformable mirror based on a detected value detected by the detector for evaluation in addition to a detected value by the detector, so as to change the uneven shape of the reflecting surface of the one deformable mirror.

With this configuration, it is possible to more quickly improve light collection performance of laser light.

The functionality of the elements disclosed herein may be implemented using circuitry or processing circuitry which includes general purpose processors, special purpose processors, integrated circuits, ASICs ("Application Specific Integrated Circuits"), conventional circuitry, controllers, and/or combinations thereof which are configured or programmed to perform the disclosed functionality. Processors and controllers are considered processing circuitry or circuitry as they include transistors and other circuitry therein. In the disclosure, the circuitry, units, controllers, or means are hardware that carry out or are programmed to perform the recited functionality. The hardware may be any hardware disclosed herein or otherwise known which is programmed or configured to carry out the recited functionality. When the hardware is a processor or controller which may be considered a type of circuitry, the circuitry, means, or units are a combination of hardware and software, the software being used to configure the hardware and/or processor.

From the above description, many improvements and other embodiments of the present invention will be apparent to those skilled in the art. Accordingly, the above description should be taken as exemplary only, and is provided for the purpose of teaching those skilled in the art the best mode for carrying out the present invention. The structural and/or functional details may be substantially altered without departing from the spirit of the present invention.

REFERENCE SIGNS LIST 1 adaptive optical apparatus
4 first deformable mirror
5 second deformable mirror
8 metric sensor
10 controller
21 reflecting surface
22 drive unit
23 drive element
26 reflecting surface
27 drive unit
28 drive element
31 adaptive optical controller
100 optical system

The invention claimed is:
1. An adaptive optical apparatus comprising:
a first deformable mirror including a first reflecting surface to reflect light propagated through an atmosphere and a plurality of drive elements to change a shape of the first reflecting surface;
a second deformable mirror that includes a second reflecting surface to reflect light from the first deformable mirror and a plurality of drive elements to change a shape of the reflecting surface of the second reflecting surface;
a detector that detects light intensity of the light from the first deformable mirror and the second deformable mirror; and
circuitry configured to:
control the drive elements of the first deformable mirror and the second deformable mirror;
execute a first update operation of controlling the plurality of drive elements of one deformable mirror of the first deformable mirror and the second deformable mirror based on a detected value detected by the detector, so as to change the shape of the reflecting surface of the one deformable mirror;
execute the first update operation at least one more time; and
execute a second update operation of controlling the plurality of drive elements of another deformable mirror of the first deformable mirror and the second deformable mirror based on a shape change amount of the reflecting surface of the one deformable mirror after performing the first update operation the at least one more time to change the shape of the reflecting surface of the other deformable mirror.

2. The adaptive optical apparatus according to claim 1, wherein a maximum displacement of the drive elements of the one deformable mirror is smaller than a maximum displacement of the drive elements of the other deformable mirror.

3. The adaptive optical apparatus according to claim 1, wherein the circuitry is further configured to update the shape of the reflecting surface of the one deformable mirror to an initial shape at a timing of executing the second update operation.

4. The adaptive optical apparatus according to claim 1, wherein the circuitry is further configured to:
execute a first initializing operation of updating the shape of the reflecting surface of the one deformable mirror to an initial shape of the one deformable mirror at a timing of executing the second update operation; and execute a second initializing operation of updating, if it is determined that the detected value by the detector is equal to or less than a predetermined threshold after executing the first initializing operation, the shape of the reflecting surface of the other deformable mirror to a predetermined initial shape.

5. The adaptive optical apparatus according to claim 1, further comprising:

a laser oscillator that oscillates laser light, wherein:

the detector detects light intensity of the oscillated laser light having passed through an optical path on an outgoing path side in which the oscillated laser light passes through the second deformable mirror and the first deformable mirror in this order and is emitted to an outside and reaches an irradiated object as light having propagated through the atmosphere, and an optical path on a return path side in which the laser light reflected by the irradiated object enters as light having propagated through the atmosphere and passes through the first deformable mirror and the second deformable mirror in this order, and an optical path of a section between the second deformable mirror and the irradiated object of the optical path on the outgoing path side and an optical path of a section between the second deformable mirror and the irradiated object of the optical path on the return path side are a same path.

6. The adaptive optical apparatus according to claim 5, further comprising:

another laser oscillator that oscillates another laser light having a power higher than that of the laser light from said laser;

another laser detector that detects light intensity of the another laser light oscillated from the another laser oscillator and having passed through the optical path on the outgoing path side and the optical path on the return path side; and the circuitry is further configured to:

adjust a light amount of the another laser light incident on the another laser detector;

execute a light amount adjusting operation executed during execution of at least one operation of the first update operation and the second update operation, and adjusting a light amount of the another laser light incident on the another laser detector, so as to make light intensity of the another laser light detected by the another laser detector fall within a dynamic range of the another laser detector; and execute a switching operation, executed after the light amount adjusting operation is completed, of switching in the first update operation an operation of controlling the plurality of drive elements of the one deformable mirror based on a detected value detected by said detector, so as to change the shape of the reflecting surface of the one deformable mirror, to an operation of controlling the plurality of drive elements of the one deformable mirror based on a detected value detected by the another laser detector, so as to change the shape of the reflecting surface of the one deformable mirror.

7. The adaptive optical apparatus according to claim 5, further comprising:

a wavefront sensor that detects a wavefront of the laser light oscillated from the laser oscillator and which has passed through the second deformable mirror and the first deformable mirror in the optical path on the outgoing path side, wherein the circuitry is further configured to:

execute an initializing operation of updating the shape of the reflecting surface of the one deformable mirror to the initial shape at a timing of executing the second update operation; and change the shape of the reflecting surface of the other deformable mirror after completing the initializing operation so that a shape of an optical wavefront of the laser light detected by the wavefront sensor before starting the initializing operation and the second update operation matches a shape of the optical wavefront of the laser light detected by the wavefront sensor after completing the initializing operation and the second update operation.

8. An optical system, comprising:

the adaptive optical apparatus according to claim 5, and a compensation result evaluation apparatus, which comprises:

a compensation deformable mirror for evaluation that includes a corresponding reflecting surface and a corresponding plurality of drive elements to change a shape of the corresponding reflecting surface;

a compensation detector for evaluation that detects the laser light reflected by the irradiated object, incident as light having propagated through the atmosphere and passed through an optical path passing through the compensation deformable mirror for evaluation, and detects an evaluation amount of evaluating a degree of compensation for atmospheric fluctuations of the optical path on the outgoing path side by the adaptive optical apparatus; and circuitry configured to control the corresponding plurality of drive elements of the deformable mirror for evaluation, wherein the circuitry is further configured to execute an imaging operation of changing the shape of the reflecting surface of the compensation deformable mirror for evaluation so that the evaluation amount detected by the compensation detector for evaluation improves, and the first update operation is an operation of controlling the plurality of drive elements of one deformable mirror of the first deformable mirror and the second deformable mirror based on a detected value detected by the compensation detector for evaluation in addition to a detected value by the detector, so as to change the shape of the reflecting surface of the one deformable mirror.

9. The adaptive optical apparatus according to claim 1, further comprising:

a wavefront shape detector that detects a wavefront shape of the light from the first deformable mirror and the second deformable mirror, wherein the circuitry is further configured to execute:

a third update operation of controlling the plurality of drive elements of either of the deformable mirrors based on a detected value by the wavefront shape detector, so as to change the shape of the reflecting surface of said either deformable mirror, and the first update operation and the second update operation when the circuitry determines that an intensity of atmospheric fluctuations is equal to or higher than a predetermined value, and the third update operation when the circuitry determines that the intensity of the atmospheric fluctuations is less than the predetermined value.

10. The adaptive optical apparatus according to claim 1, wherein:
when the first update operation is executed an n-th (n is an integer of 1 or more) time, the circuitry changes the shape of the reflecting surface of the one deformable mirror from a shape before starting the first update operation for the n-th time to a first shape and obtains light intensity detected by the detector, changes the shape of the reflecting surface of the one deformable mirror to a second shape that is symmetrical to the first shape with respect to a shape when starting the first update operation for the n-th time and obtains light intensity detected by the detector, and changes the shape of the reflecting surface of the one deformable mirror toward one shape of the first shape and the second shape that has higher light intensity detected by the detector, so as to update the shape of the one deformable mirror.

11. The adaptive optical apparatus according to claim 10, wherein the first shape is a shape defined by adding a random shape change amount, every time the first update operation is performed, to a plurality of the drive elements of the one deformable mirror to a shape when starting the first update operation for the n-th time.

12. The adaptive optical apparatus according to claim 1, further comprising:
first drive circuitry for the first deformable mirror that drives the plurality of drive elements of the first deformable mirror; and
second drive circuitry for the second deformable mirror that drives the plurality of drive elements of the second deformable mirror.

13. An adaptive optical apparatus, comprising:
a first deformable mirror including a first reflecting surface to reflect light propagated through an atmosphere and a plurality of drive elements to change a shape of the first reflecting surface;
a second deformable mirror that includes a second reflecting surface to reflect light from the first deformable mirror and a plurality of drive elements to change a shape of the reflecting surface of the second reflecting surface;
a detector that detects light intensity of the light from the first deformable mirror and the second deformable mirror;
means for controlling the drive elements of the first deformable mirror and the second deformable mirror;
means for executing a first update operation of controlling the plurality of drive elements of one deformable mirror of the first deformable mirror and the second deformable: mirror based on a detected value detected by the detector, so as to change the shape of the reflecting surface of the one deformable mirror;
means for executing the first update operation at least one more time; and
means for executing a second update operation of controlling the plurality of drive elements of another deformable mirror of the first deformable mirror and the second deformable mirror based on a shape change amount of the reflecting surface of the one deformable mirror after performing the first update operation the at least one more time to change the shape of the reflecting surface of the other deformable mirror.

14. An optical wavefront compensation method, comprising:
detecting a first light intensity of light from a reflecting surface of a first deformable mirror;
controlling the first deformable mirror based on the first light intensity that has been detected and changing a shape of the reflecting surface of the first deformable mirror;
repeating the detecting the first light intensity and the controlling the first deformable mirror at least one more time; and
changing a shape of a reflecting surface of a second deformable mirror based on a shape change amount of the reflecting surface of the first deformable mirror from a predetermined initial shape of the first deformable mirror.

15. The method according to claim 14, wherein a maximum displacement of drive elements used to change the shape of the reflecting surface of the first deformable mirror is smaller than a maximum displacement of drive elements used to change the shape of the reflecting surface of second deformable mirror.

16. The method according to claim 14, further comprising:
updating the shape of the reflecting surface of the first deformable mirror to an initial shape at a timing of changing the shape of the reflecting surface of the second deformable mirror.

17. The method according to claim 14, further comprising:
executing a first initializing operation of updating the shape of the reflecting surface of the first deformable mirror to an initial shape of the first deformable mirror at a timing of changing the shape of the reflecting surface of the second deformable mirror; and
executing a second initializing operation of updating, if it is determined that the first light intensity is equal to or less than a predetermined threshold after executing the first initializing operation, the shape of the reflecting surface of the other deformable mirror to a predetermined initial shape.

18. The method according to claim 14, further comprising:
oscillating laser light;
detecting light intensity of the oscillated laser light having passed through an optical path on an outgoing path side in which the oscillated laser light passes through the second deformable mirror and the first deformable mirror in this order and is emitted to an outside and reaches an irradiated object as light having propagated through the atmosphere, and an optical path on a return path side in which the laser light reflected by the irradiated object enters as light having propagated through the atmosphere and passes through the first deformable mirror and the second deformable mirror in this order,
wherein an optical path of a section between the second deformable mirror and the irradiated object of the optical path on the outgoing path side and an optical path of a section between the second deformable mirror and the irradiated object of the optical path on the return path side are a same path.

19. The method according to claim 18, further comprising:
oscillating another laser light having a power higher than that of said laser light;
detecting light intensity of the another laser light oscillated from the another laser oscillator and having passed through the optical path on the outgoing path side and the optical path on the return path side;

adjusting a light amount of the another laser light;

executing a light amount adjusting operation executed during of at least one operation of changing the shape of the reflecting surface of the first deformable mirror and the changing the shape of the second deformable mirror, and adjusting a light amount of the another laser light which has been detected, so as to make light intensity of the another laser light which has been detected fall within a dynamic range of a laser detector; and execute a switching operation, executed after the light amount adjusting operation is completed, of switching in the changing the shape of the reflecting surface of the first deformable mirror based on a detected value detected by said detecting the first light intensity, so as to change the shape of the reflecting surface of the one deformable mirror, to an operation of controlling the shape of the reflecting surface of the first deformable mirror based on a detected value, so as to change the shape of the reflecting surface of the first deformable mirror.

20. The method according to claim 18, further comprising:

executing an initializing operation of updating the uneven shape of the reflecting surface of the one deformable mirror to the initial shape at a timing of executing the changing the shape of the reflecting surface of the second deformable mirror; and change the shape of the reflecting surface of the second deformable mirror after completing the initializing operation so that a shape of an optical wavefront of the laser light detected by a wavefront sensor which detects a wavefront of the laser light oscillated from the laser oscillator and which has passed through the second deformable mirror and the first deformable mirror in the optical path on the outgoing path side before starting the initializing operation and the changing the shape of the reflecting surface of the second deformable mirror matches a shape of the optical wavefront of the laser light detected by the wavefront sensor after completing the initializing operation and the changing the shape of the reflecting surface of the second deformable mirror.

* * * * *